United States Patent
Palmer

(10) Patent No.: US 9,862,506 B2
(45) Date of Patent: Jan. 9, 2018

(54) LAUNCH VEHICLE AND SYSTEM AND METHOD FOR ECONOMICALLY EFFICIENT LAUNCH THEREOF

(71) Applicant: 8 Rivers Capital, LLC, Durham, NC (US)

(72) Inventor: Miles R. Palmer, Chapel Hill, NC (US)

(73) Assignee: 8 Rivers Capital, LLC, Durham, NC (US)

(*) Notice: Subject to any disclaimer, the term of this patent is extended or adjusted under 35 U.S.C. 154(b) by 0 days.

(21) Appl. No.: 15/251,408

(22) Filed: Aug. 30, 2016

(65) Prior Publication Data

US 2016/0368623 A1 Dec. 22, 2016

Related U.S. Application Data

(63) Continuation of application No. 14/211,698, filed on Mar. 14, 2014, now Pat. No. 9,463,881.
(Continued)

(51) Int. Cl.
*B64G 1/40* (2006.01)
*B64G 1/00* (2006.01)
(Continued)

(52) U.S. Cl.
CPC ............ *B64G 1/409* (2013.01); *B64G 1/002* (2013.01); *B64G 1/402* (2013.01); *B64G 1/406* (2013.01);
(Continued)

(58) Field of Classification Search
CPC .. F02K 9/95; F42B 6/006; F42B 15/10; F42B 15/12; F41B 6/006; F41B 6/00; F41A 1/04; B64G 1/406; B64G 1/002
See application file for complete search history.

(56) References Cited

U.S. PATENT DOCUMENTS 2,790,354 A  4/1957 Yoler
3,016,693 A  1/1962 Jack et al.
(Continued)

FOREIGN PATENT DOCUMENTS

GB  1 073 144  6/1967
GB  2 233 076  1/1991
(Continued)

OTHER PUBLICATIONS

Allam et al., "High Efficiency and Low cost of Electricity Generation from Fossil Fuels While Eliminating Atmosperic Emissions, Including Carbon Dioxide," *Energy Procedia*, 2012, pp. 1-12.
(Continued)

*Primary Examiner* — Benjamin P Lee
(74) *Attorney, Agent, or Firm* — Womble Bond Dickinson (US)LLP

(57) ABSTRACT

The present disclosure relates to a launch system, a launch vehicle for use with the launch system, and methods of launching a payload utilizing the launch vehicle and/or the launch system. The disclosure can provide for delivery of the payload at a terrestrial location, an Earth orbital location, or an extraorbital location. The launch vehicle can comprise a payload, a propellant tank, an electrical heater wherein propellant, such as a light gas (e.g., hydrogen) is electrically heated to significantly high temperatures, an exhaust nozzle from which the heated propellant expands to provide an exhaust velocity of, for example, 7-16 km/sec, and sliding electrical contacts in electrical connection with the electrical heater. The launch vehicle can be utilized with the launch system, which can further comprise a launch tube formed of concentric electrically conductive tubes, as well as an electrical energy source, such as a battery bank and associated inductor.

11 Claims, 12 Drawing Sheets

Related U.S. Application Data

(60) Provisional application No. 61/799,931, filed on Mar. 15, 2013.

(51) Int. Cl.

| | | |
|---|---|---|
| *F42B 6/00* | (2006.01) | |
| *F41A 1/04* | (2006.01) | |
| *F42B 15/10* | (2006.01) | |
| *F42B 15/12* | (2006.01) | |
| *F02K 9/95* | (2006.01) | |
| *F41F 1/00* | (2006.01) | |
| *F42C 11/00* | (2006.01) | |
| *F41B 6/00* | (2006.01) | |

(52) U.S. Cl.
CPC ............... *F02K 9/95* (2013.01); *F41A 1/04* (2013.01); *F41B 6/006* (2013.01); *F41F 1/00* (2013.01); *F42B 6/006* (2013.01); *F42B 15/10* (2013.01); *F42B 15/12* (2013.01); *F42C 11/00* (2013.01); *F41B 6/00* (2013.01)

(56) References Cited

U.S. PATENT DOCUMENTS

| | | | |
|---|---|---|---|
| 3,369,455 | A | 2/1968 | Jones |
| 3,374,668 | A | 3/1968 | Godfrey |
| 3,583,161 | A | 6/1971 | Simms |
| 4,347,463 | A | 8/1982 | Kemeny et al. |
| 4,480,523 | A | 11/1984 | Young et al. |
| 4,577,461 | A | 3/1986 | Cann |
| 4,590,842 | A | 5/1986 | Goldstein |
| 4,677,895 | A | 7/1987 | Carlson et al. |
| 4,715,261 | A | 12/1987 | Goldstein |
| 4,796,511 | A | 1/1989 | Eyssa |
| 4,821,509 | A | 4/1989 | Burton et al. |
| 4,957,035 | A | 9/1990 | Eskam |
| 4,967,637 | A | 11/1990 | Löffler et al. |
| 4,974,487 | A | 12/1990 | Goldstein |
| 5,012,719 | A | 5/1991 | Goldstein |
| 5,024,137 | A | 6/1991 | Schroeder |
| 5,033,355 | A | 7/1991 | Goldstein |
| 5,072,647 | A | 12/1991 | Goldstein et al. |
| 5,171,932 | A | 12/1992 | McElroy |
| 5,183,956 | A | 2/1993 | Rosenberg |
| 5,233,903 | A | 8/1993 | Saphier |
| 5,640,843 | A | 6/1997 | Aston |
| 6,311,926 | B1 | 11/2001 | Powell |
| 6,895,743 | B1 | 5/2005 | McElheran |
| 6,921,051 | B2 | 7/2005 | Lopata et al. |
| 6,993,898 | B2 | 2/2006 | Parkin |
| 7,246,483 | B2 | 7/2007 | Minick et al. |
| 7,775,148 | B1 | 8/2010 | McDermott |
| 8,746,120 | B1 | 6/2014 | Nolting |
| 2011/0259230 | A1 | 10/2011 | Sawka et al. |
| 2012/0175457 | A1 | 7/2012 | Hunter |
| 2012/0187249 | A1 | 7/2012 | Hunter et al. |
| 2012/0227374 | A1 | 9/2012 | Zegler |
| 2014/0306065 | A1 | 10/2014 | Palmer |
| 2015/0175278 | A1 | 6/2015 | Hunter |
| 2015/0307213 | A1 | 10/2015 | Hunter |

FOREIGN PATENT DOCUMENTS

| | | |
|---|---|---|
| JP | H05-322486 | 12/1993 |
| WO | WO 2005/054674 | 6/2005 |

OTHER PUBLICATIONS

Author Unknown, "The SHARP Gas Gun," *Energy & Technology Review*, Jul. 1993, pp. 1-12.

McNab, "Launch to Space With an Electromagnetic Railgun," *IEEE Transactions on Magnetics*, 2003, pp. 295-304, vol. 39, No. 1.

Palmer et al., "High Temperature Superconductor Applications in Electromagnetic Space Launch," *Progress in High Temerature Superonductivity*, vol. 8 Wolrld Scientific Publ., Teaneck, NJ, 1988, p. 168-173.

Palmer et al., Electromagnetic Space Launch: A Re-evaluation in Light of Current Technology and Launch Needs and Feasibility of a Near Term Demonstration, *IEEE Transactions on Magnetics*, vol. 25, No. 1, Jan. 1989, pp. 393-399.

Palmer et al. "A Revolution in Access to Space Through Spinoffs of SDI Technology," Keynote Paper, 5th Symposium on Electromagnetic Launch Technology, Destin, Florida, Apr. 1990, *IEEE Transaction on Magnetics*, vol. 27, No. 1, Jan. 1991, p. 11-20.

Palmer, "Synergism in Research and Development Between Electromagnetic Guns and Spacecraft Electric Propulsion," *EIII Transactions on Magnetics*,1993, vol. 29, No. 1. pp. 706-710.

Palmer, "Implications of Gun Launch to Space for Nanosatellite Architectures," *Proceedings of the International Conference on Integrated Micro/Nanotechnology for Space Applications*, Houston, Texas, Oct. 30, 1995, 6 pages.

Palmer, "Economics and Technology Issues for gun Launch to Space," *Space Technology International Forum*, 1996, Albuquerque, New Mexico, 6 pages.

Palmer, "Market, Cost, and Technical Factors Affecting Advanced Space Launch Technologies," 12th *International Symposium on Electromagnetic Launch Technology*, Snow Bird, Utah, May 2005, 15 pages.

Palmer et al., "Component and Subscale Testing in Support of the Design of a Battery Power Supply for the Electromagnetic Gun Research Facility," Presented Paper, IEEE Pulsed Power Conference, Washington, D.C., Jun. 29, 1987, pp. 46-49.

Palmer, "Midterm to Far Term Applications of Electromagnetic Guns and Associated Power Technology," Keynote paper, Applications Panel, 6th Symposium on Electromagnetic Launch Technology, Austin, Texas, Apr. 1992, published IEEE Transactions on Magnetics, 29(1) Jan. 1993, p. 345-348.

Palmer, "Motivation for a Near Term Gun Launch to Space Demonstration and a Variable Inductance Power Supply Concept to Minimize Initial Demonstration Costs," IEEE Transactions on Magnetics, vol. 29(1), Jan. 1993, p. 478-483.

Turman et al., "Co-Axial Geometry Electromagnetic Launch to Space," *AIAA Paper 94-4626, AIAA Apace Programs and Technologies Conference*, Hunsville, Alabama, Sep. 29, 1994, 15 pages. http.//arc.aaa.org, DOI No. 10.2514/6.1994-4626.

Walls et al, "Application of Electromagnetic Guns to Future Naval Platforms," *IEEE Transactions on Magnetics*, 1999, pp. 262-267, vol. 35, No. 1.

LAUNCH VEHICLE AND SYSTEM AND METHOD FOR ECONOMICALLY EFFICIENT LAUNCH THEREOF

CROSS-REFERENCE TO RELATED APPLICATIONS

The present application is a continuation of U.S. patent application Ser. No. 14/211,698, filed Mar. 14, 2014, and claims priority to U.S. Provisional Patent Application No. 61/799,931, filed Mar. 15, 2013, the disclosures of which are incorporated herein by reference in their entireties.

FIELD OF THE DISCLOSURE

The present disclosure relates to systems, methods, and apparatuses for launch of a payload. More particularly, the payload may be intended for space launch or delivery to a terrestrial location, and the present disclosure can provide for acceleration of the payload from a launch tube to its desired location.

BACKGROUND

Many means are known for accelerating an object. Relatively small projectiles are efficiently accelerated via controlled explosive charges, such as with gunpowder. As the mass of the object being accelerated increases, however, the explosive force required greatly increases. For example, chemical combustion rockets are presently the only means that have been shown to be effective for launching payloads into space. Although much work has been done in attempting to develop alternative technologies for rapid acceleration of large payloads, such as electromagnetic launchers and plasma arc acceleration, no alternative technology to date has been proven useful and reliable, particularly in the launch of space vehicles.

In relation to space launch, while rocket propulsion is a long proven technology, reliance solely on rocket launch is problematic in that it remains expensive, dangerous, and is dominated by government funding. Such problems are illustrated by the retirement and lack of suitable replacement for the National Aeronautic and Space Administration's Space Shuttle program. The lead time for a new space launch using rocket propulsion is typically three to ten years. Space launches are infrequent, typically occurring less than once a year to a few times per year per customer. This has hampered advancements in certain technologies, such as communications. For example, satellite technologies have been slow and expensive to develop and are often outdated quickly after launch and satellite placement. These factors and attendant continued government involvement have locked in high costs and low profits. In particular, it is widely understood that present rocket launch technology can cost greater than $20,000 per kilogram of material for placement in an earth orbit.

Many types of gun launch systems have been proposed. A taxonomy of the various types is shown below.

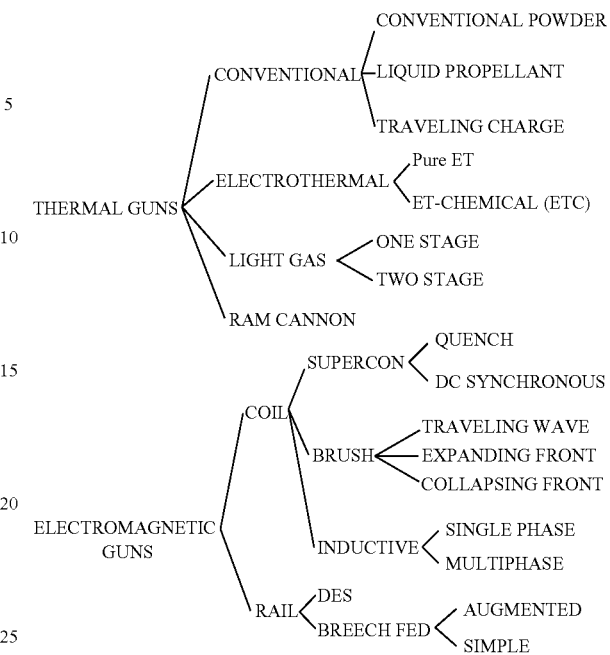

All of the foregoing gun launch approaches share a common feature in that they impose unacceptably great acceleration forces on the payload. Accelerations are typically tens of thousands of G's. These impose enormous challenges in designing payloads that can survive the launch and still accomplish complex tasks after launch. Despite these challenges, perceived payoffs were so high that the US government invested hundreds of millions in R&D on all the various types of gun launchers in the 1970's through the early 1990's.

A few commercial entities have attempted to enter the space launch market; however efficient and reliable launch means are yet to be proven. Moreover, the persistently high costs of space launch mean government spending will continue to be an important factor in space launch technologies, and profitability will continue to remain low. Accordingly, there remains a need in the art for systems, methods, and apparatuses for reliable and efficient launch of projectiles, including space vehicles.

SUMMARY OF THE DISCLOSURE

The present disclosure relates to launch vehicles, launch systems, and methods of launching a payload. The disclosure provides for delivery of the payload to any desired location on Earth, in earth orbit, or in space generally. The payload can comprise a variety of objects, including satellites, raw materials or resources, ballistics, and the like. The payload further can include human passengers.

In one aspect, the present disclosure provides a launch vehicle. Preferably, the launch vehicle is adapted for high velocity delivery of a payload. In certain embodiments, the launch vehicle can comprising the following: a payload container; a propellant tank containing a propellant; an electrical heater in fluid connection with the propellant tank and adapted for electrical heating of the propellant to form an exiting exhaust; and one or more electrical contacts adapted for directing flow of electrical current through the electrical heater. In further embodiments, the launch vehicle also can comprise an expansion nozzle in fluid communication with the exiting exhaust from the electrical heater. In some embodiments, the electrical heater can be a resistive heater. In particular, the resistive heater can comprise an electrically heated porous cylinder inside a containment vessel. Specifically, the electrically heated porous cylinder can comprise tungsten walls. In further embodiments, the electrical heater can be an arc heater. Preferably, the arc can be a swirl stabilized vortex arc. Further, the arc heater can comprise a swirl chamber inside a containment vessel. In some embodiments, the arc heater can comprise coaxial electrical terminals spaced apart by the swirl chamber. In other embodiments, the electrical contacts can be sliding electrical contacts.

In a further aspect, the present disclosure provides a launch system. In various embodiments, the launch system can comprise the following: a launch vehicle as described herein; a launch tube comprising two or more concentric, electrically conductive tubes separated by an insulator, the launch tube being adapted for propulsion of the launch vehicle therethrough; and an electrical energy source. In some embodiments, the electrical energy source can comprise a battery bank. In further embodiments, the electrical energy source further can comprise an inductor.

In still another aspect, the present disclosure provides a method for launching a payload. In certain embodiments, the method can comprise the following steps: providing the payload in a payload container of a launch vehicle included in the launch system as described herein; and electrically heating the propellant in the electrical heater to form the exiting exhaust at a velocity sufficient to propel the payload out of the launch tube.

In further embodiments, the present disclosure can be characterized by a number of different embodiments. In particular, the presently disclosed launch vehicle, launch system, and method for launching a payload can be defined by one or more of the following statements.

The disclosure encompasses a launcher in which a launch package is accelerated from a launch tube using material exhausted from the launch package wherein the exhaust is formed by the heating of a low atomic weight element contained within (or in front of and in contact with) the launch package, wherein the energy used for such heating is provided electrically to the launch package from the launch tube walls.

The launcher is located on the earth.
The launcher is located in free space.
The launcher is located on another celestial body.
The exit velocity is in the range of 2,000-50,000 m/sec.
The exit velocity is 4,000-30,000 m/sec.
The exit velocity is 6,000-15,000 msec.
The exit velocity is 8,000-12,000 m/sec.
The launch package is first accelerated to an initial velocity of 100-5,000 msec using a single stage light gas gun.
The velocity is 500-3,000 msec.
The velocity is 1500-2500 msec.
The light gas is preheated.
The gas is electrically heated.
The electrical heating is derived from the same energy supply as the launcher.
The tube is constructed with two concentric conductors one inside the other with minimum thickness of insulation between them so as to minimize the volume of the magnetic field "charged up" by the high drive currents going down and back up the tube to drive a launch package heater. This magnetic field energy has several deleterious effects. An undesired magnetic field requires energy which does not help propel the launch package. The undesired magnetic energy may be discharged immediately upon launch and can cause catastrophic damage if the energy level is not minimized (as is achieved by the present disclosure). This has caused prior art launchers, such as railguns, to fail to achieve high velocities. The magnetic field produces high mechanical forces and stresses which cause breakdown or higher cost or wear. This also has caused prior art launchers, such as railguns, to fail to achieve high velocities. The magnetic field produces high induced voltages which can cause arcing in places where it is not wanted and can cause wear or catastrophic damage or failure. The magnetic field produces a force on any arc formed between the launch tube conductors and the sliding contacts that transmit electrical current and energy to the launch package. Usually these forces cause the arc to blow forward at up to the speed of light. The electrical current is then diverted away from where it is wanted and needed to propel the launch package to a different area where it is not wanted, causing loss of energy, retarding of the launch package, wear, and/or catastrophic damage and/or failure. This further has caused prior art launchers, such as railguns, to fail to achieve high velocities.

The present disclosure provides an "electroantimagnetic" launcher. Prior art launchers, such as railguns and coil guns, actively induced formation of magnetic forces to propel the launch package. The required generation of very high magnetic fields led to the aforementioned deleterious effects.

The present disclosure minimizes magnetic fields.
The present disclosure uses the force of hot expanding gas formed by electrical heating facilitated by tube-conducted electrical energy.
The present disclosure utilizes expansion of hot, light gas.
Hydrogen can be heated above 5,000 K and result in an expelled gas consisting of individual atoms of hydrogen.
Heating can be up to 100,000 K, which can result in the exhaust velocity being 77,000 m/sec.
Launch velocity can be as great as 150,000 m/sec or about two times the exhaust velocity.
Maximum velocities can be limited to use in space since the practical limit for launch from the surface of the Earth is about 100,000 msec due to aerodynamic forces at that speed, which can reach about 1,000,000 PSI.
Velocities with Earth launch can practically reach about 50,000 msec which produces 250,000 PSI, which can be mitigated using transpiration cooled metal nosetips.
Velocities with Earth launch can practically reach about 18,000 msec, which produces about 30,000 PSI, which can be mitigated by ablating carbon nosetips. Another limit is imposed by launcher length when people are launched.
Velocities for launchers ferrying human passengers can be limited to an acceleration of no more than about 20 G's. Using a launch tube with a length up to about 1,000 km can safely lead to velocities of up to about 20,000 msec.
The light gas is heated in an electrical heater.
The heater is a resistive heater.
The heater is an arc heater.
The heating element is a transpiration tube element.
The heater wall is cooled by transpiration.
The light gas is seeded with an ionizable element such as cesium or rubidium or potassium or sodium or lithium to promote arc stability and conductivity and ionization.
The conductive sliding contacts make mechanical sliding contact with the tube walls with a low voltage drop.
The conductive sliding contacts make an arcing sliding contact with the tube walls with a minimized voltage drop.
The arc is contained via mechanical containment using a sliding insulating perimeter.

The arc is contained via magnetic forces.

The magnetic forces are generated by the current transferring through the contact via a specially shaped current loop.

The magnetic forces are generated by self contained power source on the launch package.

The magnetic forces are generated by a magnet.

The magnet is a superconducting magnet.

The sliding contact is cooled by transpiring fluid.

The sliding contact is cooled by material in the sliding contact melting or vaporizing.

The transpiring fluid is conductive.

The fluid is a low melting metal having a low ionization potential.

The metal is cesium, aluminum, lithium or analogous low melting soft metals with low ionization potentials.

The insulating perimeter is transpiration cooled.

The transpiration fluid is an insulating material such as hydrogen, sulfur hexafluoride, or other liquid or gas.

At least a portion of the sliding contact can be adapted to exhibit one or more state transitions.

The sliding contact can define a sliding solid-solid interaction with a solid tube wall that transitions to a liquid-solid interaction when at least a portion of the sliding contact that interacts with the tube wall transitions to a liquid metal melt.

The state transition occurs at a launcher velocity of about 1000 to about 2000 msec.

The state transitions to an arcing contact at a velocity of about 1500 to about 3000 msec.

Arc voltage can be about 100 to abut 300 V.

The arc is stably positioned at the contact and does not substantially move outside of the desired contact region.

The conductive tube walls have slotted tracks of varying numbers and geometries for the sliding contacts to make contact with conductive strips and which prevent arcing between the tube conductors and which also serve to align the launch package and keep it from rotating in the tube.

The conductive strips define longitudinal tracks extending at least a portion of the length of the conductive tube.

The conductive strips are coaxial with the conductive tube.

The conductive tube walls have layers of different materials.

The predominant material is steel or aluminum.

The innermost layer is a high temperature wear resistant conductive material such as tungsten or rhenium or hardened copper.

An interlayer of material is between the predominant outer layer and the innermost layer.

The interlayer is copper or molybdenum.

A majority of the inner surface of the conductive tube walls is coated with an insulator.

Substantially all of the inner surface of the conductive tube walls apart from the sections defined by the conductive strips is coated with an insulator.

The insulator on the inner wall of the conductive is a ceramic or a composite.

There is one current outbound path in series with one return current path.

There are multiple current outbound paths in parallel, and all in series with multiple return current paths.

The launcher inductance is lowered proportionately to the number of parallel current paths.

The lower inductance lowers the magnetic field energy and thus the detrimental effects of the magnetic field.

The slotted track insulators are transpiration cooled.

The conductive strips are transpiration cooled.

The transpiration fluid is a conductive material.

The conductive strips are conductively and/or convectively cooled.

The fluid is a low melting metal having a low ionization potential.

The metal is cesium, aluminum, lithium or analogous low melting soft metals with low ionization potentials.

The propellant tank has an outer diameter that is substantially identical to the inner diameter of the launch tube.

The propellant tank includes sliding contact strips on at least a portion of its outer surface.

The sliding contact strips vaporize as the velocity of the launch vehicle increases.

The vaporized strips provide a low drag gas bearing to minimize frictional drag.

The strips produce a vapor that is insulating so that it inhibits rather than promotes any arcing.

The sliding contact strips comprise pores filled with liquid sulfur hexafluoride.

A device can be inserted into the conductive launch tube for inspection, alignment, and repair.

The launch tube is aligned by active alignment devices.

The launch tube is substantially horizontal except near the exit end where it curves upward.

The launch tube follows the curvature of the Earth.

The launch tube is at a constant slope angle.

The tube bed is graded to the tube constant slope angle.

The launch tube is evacuated and backfilled with a low pressure of light gas to minimize aerodynamic drag during acceleration while providing increased resistance to arc breakdown ahead of the launch package.

The launch tube is evacuated and a high speed pulse of gas is introduced time sequentially along the tube via transpiration to coat the walls with a layer of gas which insulates the walls but does not have time to expand into the majority of the tube diameter and thus increase aerodynamic drag.

An initial section of the launch tube is not electrical conductive.

The launch vehicle is accelerated through the initial section of the launch tube utilizing an expanding gas that is not electrically heated.

The launch tube exit is sealed with an exit device to prevent air ingress until the launch package arrives.

The exit device is a high speed mechanical shutter.

The exit device is one or a series of aerodynamic curtains.

The exit device is a thin membrane or membranes which the launch package flies through.

The exit device is a thin membrane or membranes, with one or several small explosive charges which destroy the launch package if not detonated prior to launch package arrival and which allow the launch package to pass if detonated prior to launch package arrival.

The launch tube is moveable.

The launch tube is moveable in one dimension to change launch elevation or launch azimuth.

The launch tube is moveable in two dimensions to enable change in both elevation and azimuth.

The launch tube is mounted on a moveable vehicle such as a ship or a submarine.

The launch tube is installed in a slanted tunnel underground.

The launch tube is installed on naturally sloping ground.

The launch package has inertial sensors and actuators which actively maintain its alignment and orientation while being accelerated in the launch tube.

The launch package is monitored during the launch acceleration interval for integrity and nominal performance.

Emergency procedures can be implemented based on monitoring results to optimize the launch and to protect the launch tube.

The launch can be aborted by destroying the launch package immediately or shortly after its exit from the launch tube.

The launch package is separated during or immediately after launch into a discarded portion and a flyout payload portion.

The flyout payload has a heat shield with a transpiration cooled nosetip to maintain the nosetip integrity, shape, sharpness, low drag, and low pressure moment during exit from the atmosphere.

The flyout payload has a small positive stability, neutral stability, or a negative aerodynamic stability based on its center of pressure location relative to its center of mass location.

The flyout payload can maneuver at high lateral acceleration levels to optimize flight path through the atmosphere and change launch azimuth.

The flyout payload has a high lift to drag ratio.

The payload has a lifting body design.

The flyout payload has aerodynamic control surfaces with very high speed response and low drag.

The control surfaces are base split flaps.

The control surfaces are actuated with piezoelectric actuators.

The flyout payload is an orbital satellite.

The flyout payload is a suborbital payload.

The satellite is a communications satellite or a sensor satellite or resupply vehicle or a weapon.

The payload is a commercial package to be delivered rapidly to long distances.

The payload is a sensor payload or a UAV or other unmanned vehicle.

The payload is a weapon.

The payload contains subparts that are dispersed before impact.

The payload remains intact until impact.

Multiple payloads impact at or near the same location for deep penetration.

The satellite contains an inflatable solar array for power.

The inflatable structure hardens to rigidity after deployment.

The satellite contains an inflatable magnet array to effect attitude control in orbit.

The inflatable structure hardens to rigidity after deployment.

The satellite contains an inflatable antenna array to effect communications in orbit.

The inflatable structure hardens to rigidity after deployment.

The satellite contains inflatable structures to effect missions in orbit.

The inflatable structures harden to rigidity after deployment.

The design lifetime of the satellite is less than 10 years, or less than 5 years, or less than 2 years, or less than 1 year.

The satellite orbital altitude is such that the orbital lifetime due to aerodynamic drag is less than 5 years, or less than 2 years, or less than 1 year, or less than 6 months, or less than 3 months, or less than 1 month.

The satellite achieves longer orbital lifetime through magnetic thrust against the Earth's magnetic field using an inflatable magnetic array.

The satellite achieves longer orbital lifetime through pressure induced by sunlight and solar wind on an inflatable solar sail.

The satellite achieves longer orbital lifetime through magnetohydrodynamic (MHD) propulsion against ionized upper atmosphere molecules.

The payload cost is reduced through using commercial grade parts with high initial failure rates and then iterating quickly through launch, fail, and redesign cycles to achieve higher and higher reliability quickly over time.

The launcher and thousands of payloads are designed simultaneously for a single purpose.

The payloads are all communications satellites.

The satellites are radiofrequency communication satellites.

The satellites are optical communications satellites.

The payloads are reflective relays for millimeter waves or optical beams.

The payloads are nuclear waste containers.

The light gas propellant for the launcher and/or the single stage light gas gun is hydrogen.

The light gas is heated to 1000 to 100,000 K, to 2000-50,000 K, to 2500-20000 K, to 3000 to 15000 K, to 3500 to 10000 K, to 3500 to 5000 K.

The exhausted gas is molecular hydrogen (0.002 kg/mole).

The exhausted gas is atomic hydrogen (0.001 kg/mole).

The exhausted gas is hydrogen plasma (0.0005 kg/mole).

The exhaust device contains a nozzle throat transpiration cooled with a light gas (e.g., hydrogen).

The exhaust device contains a nozzle transpiration cooled with a light gas (e.g., hydrogen).

The exhaust device contains a porous nozzle throat in which the pores are filled with a material that absorbs heat by melting and/or vaporization and/or disassociation (e.g., solid hydrogen or lithium or ice).

The exhaust device contains a porous nozzle in which the pores are filled with a material that absorbs heat by melting and/or vaporization and/or disassociation (e.g., solid hydrogen or lithium or ice).

The flyout payload has a heat shield with a porous nosetip filled with a material (e.g., solid hydrogen or lithium or ice) that absorbs heat by melting and/or vaporization and/or disassociation to maintain the nosetip integrity, shape, sharpness, low drag, and low pressure moment during exit from the atmosphere.

The electrical energy for the launch system is supplied by a battery bank.

The batteries are lead acid batteries.

The batteries are automotive batteries.

An inductor is interposed between the battery bank and the launcher such that the battery bank charges the inductor and then the inductor is switched over to and discharges into the launcher tube.

The discharge into the launcher is initiated by explosively actuated switches.

The discharge switching is accomplished with conventional switches with capacitor mediated arcing control.

The inductor has a core composed of a high permeability material.

The core is designed for high discharge rates and low eddy current losses.

The inductor is actively cooled.
The core is actively cooled.
The conductors are actively cooled.

BRIEF DESCRIPTION OF THE FIGURES

Figure 1:
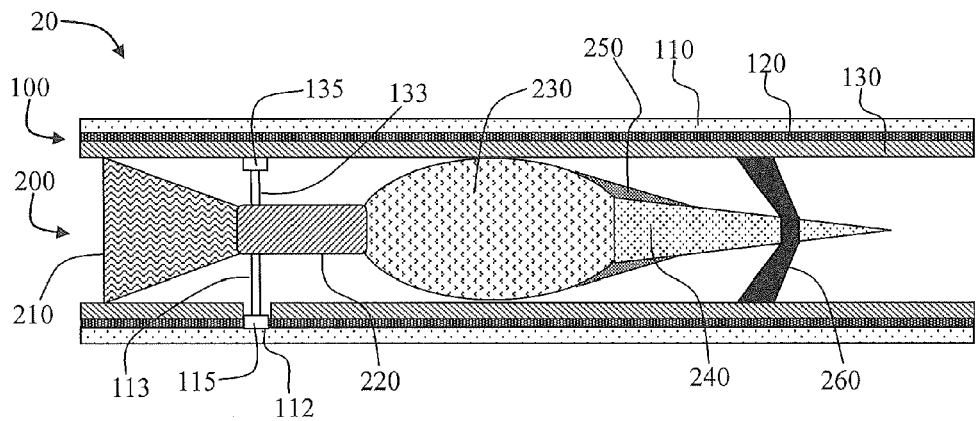
Figure 2:
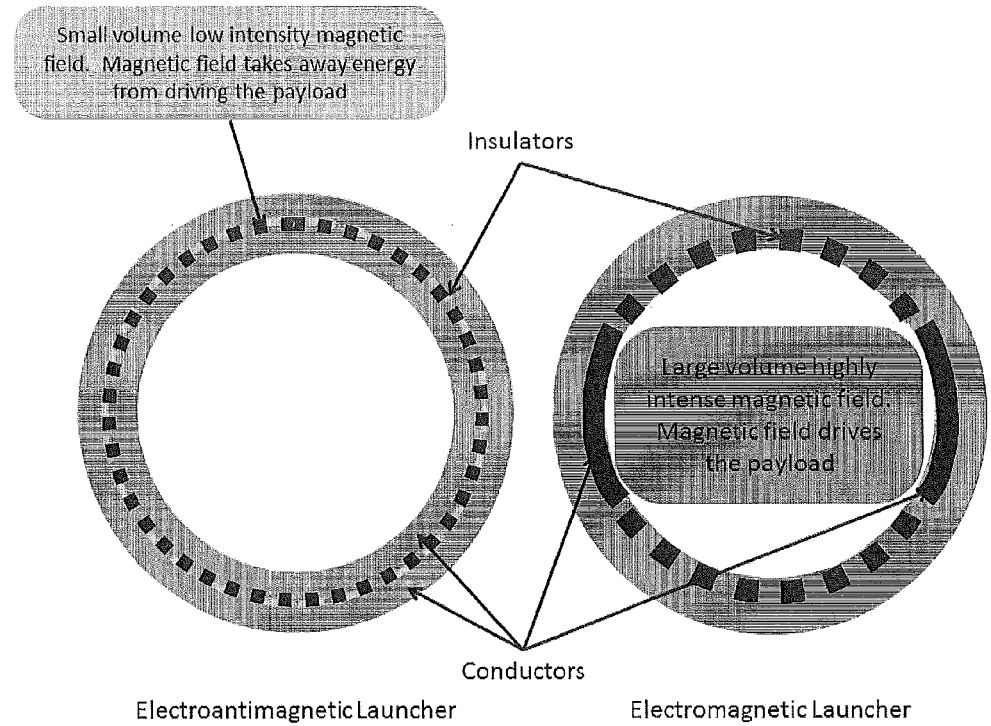
Figure 3:
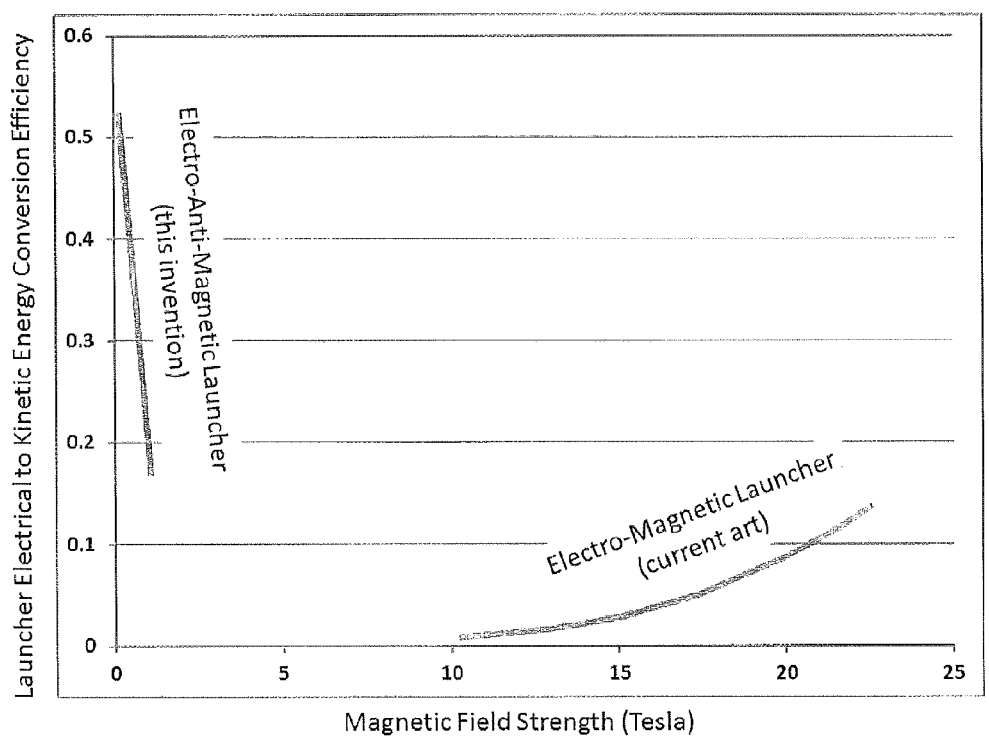
Figure 4:
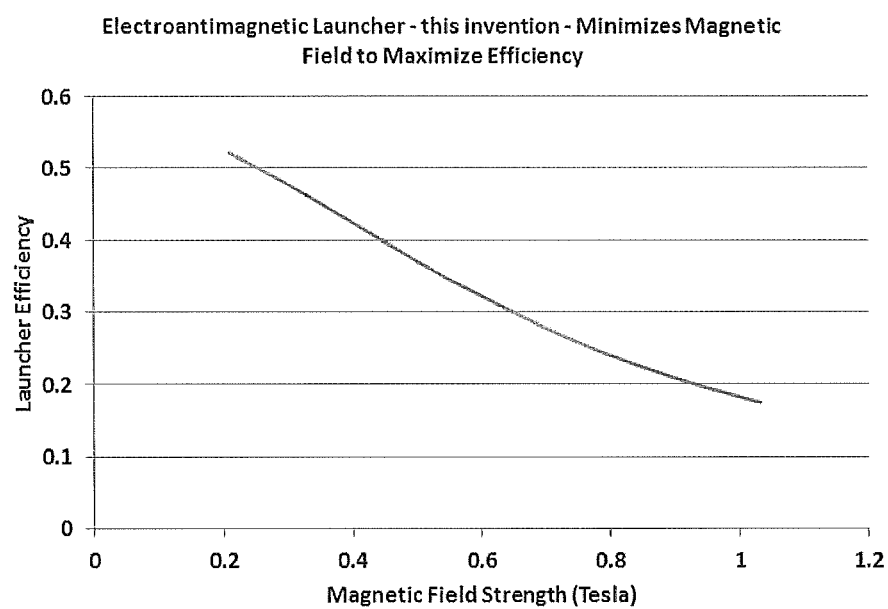
Figure 5:
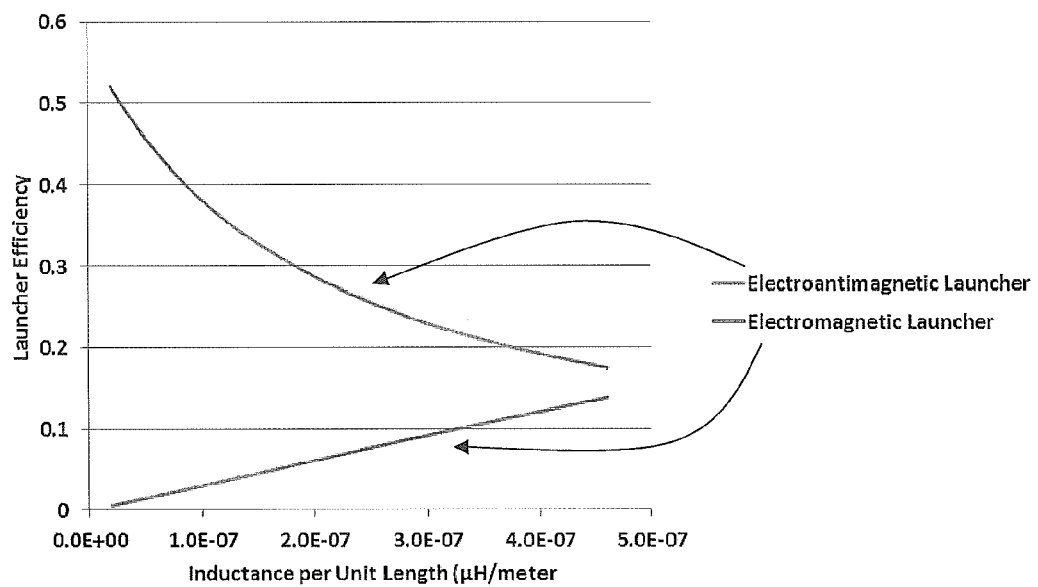
Figure 6:
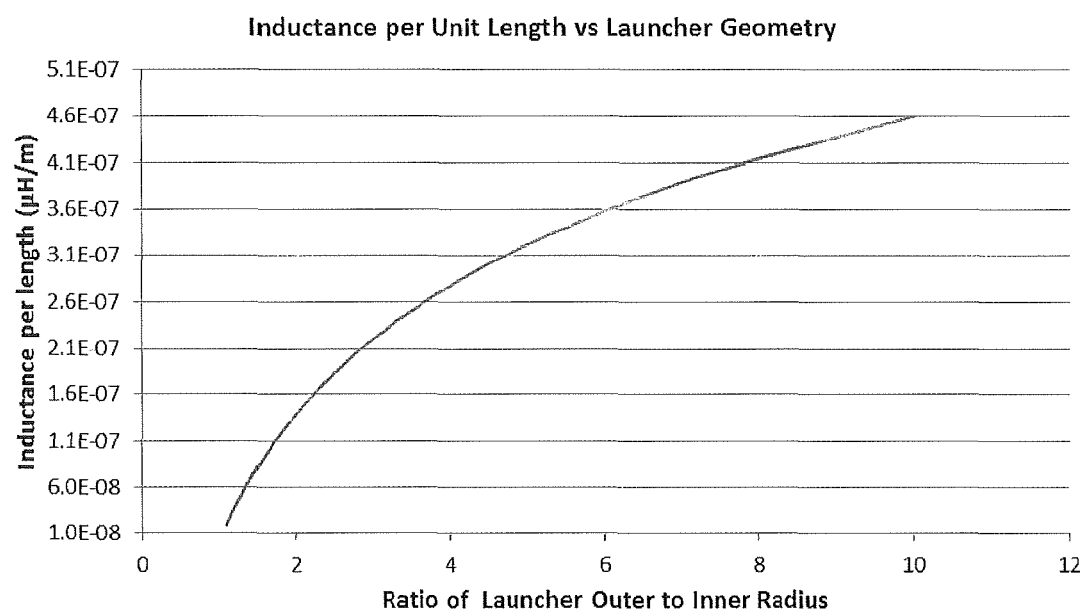
Figure 7:
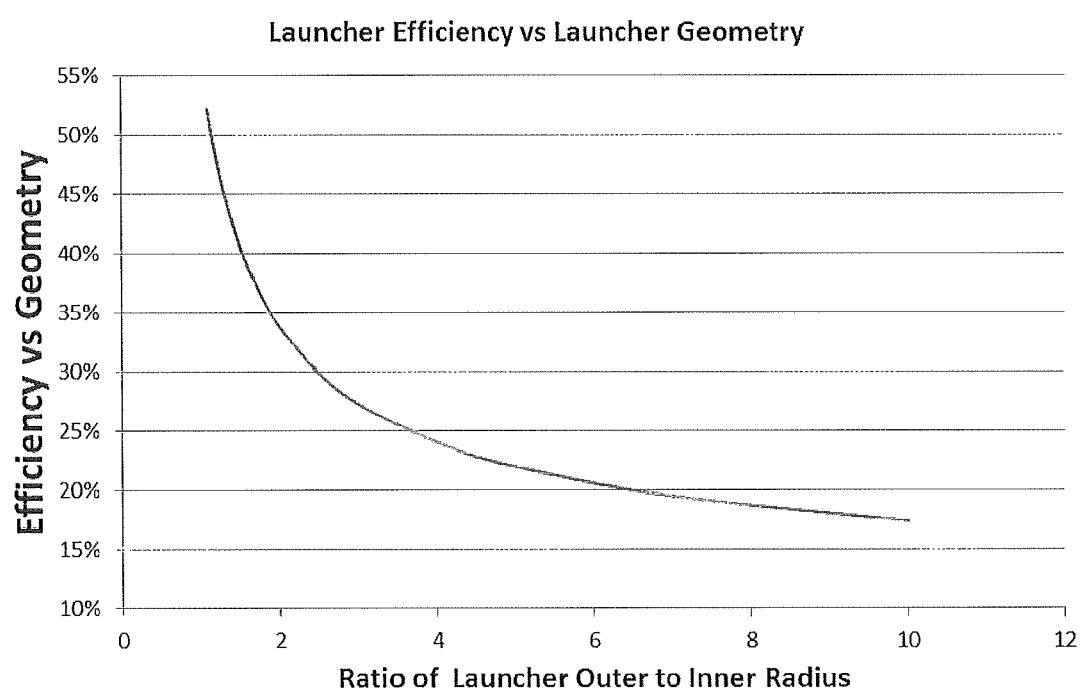
Figure 8:
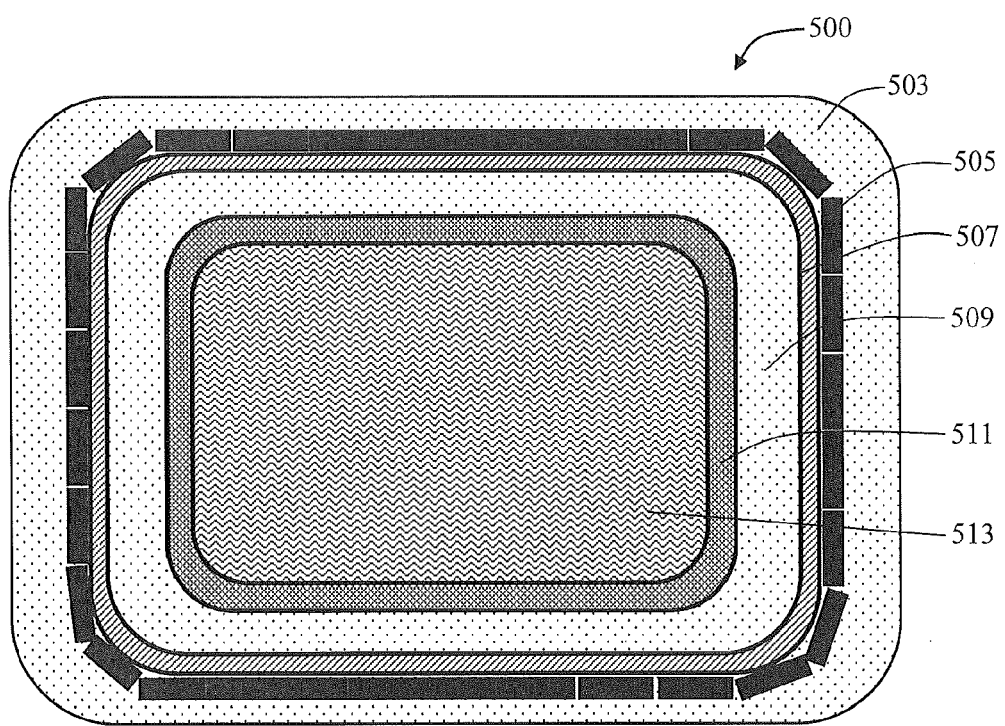
Figure 9:
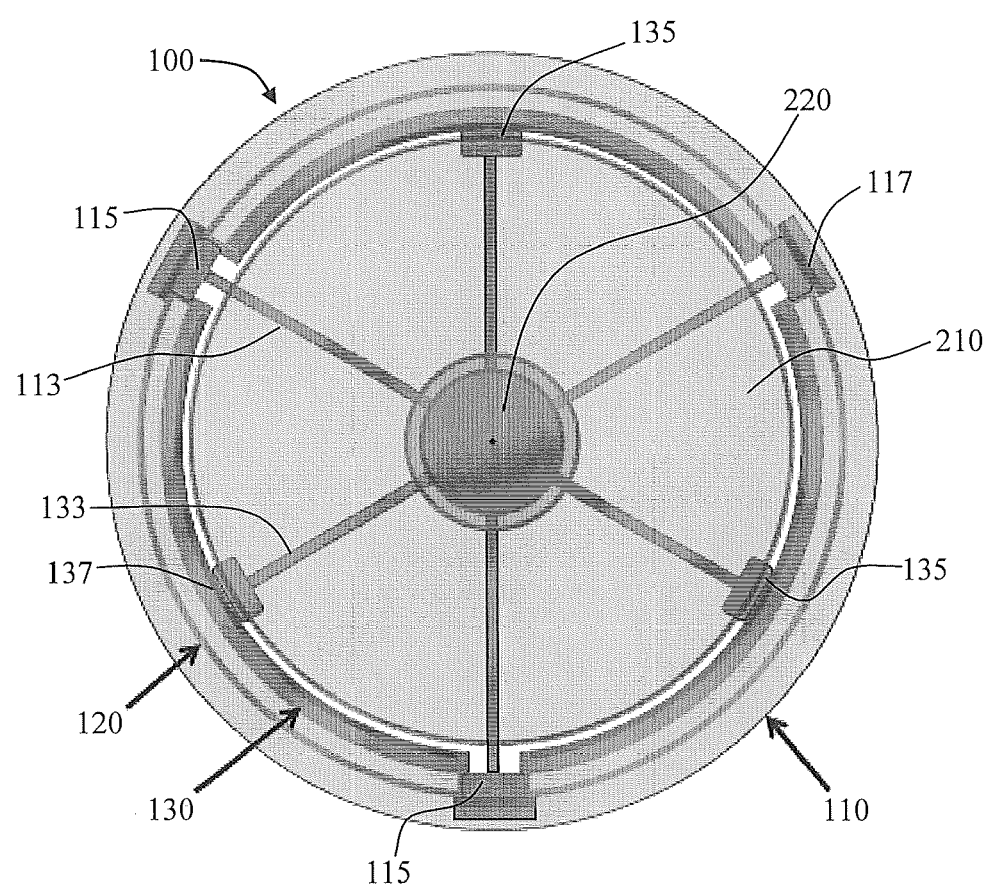
Figure 10:
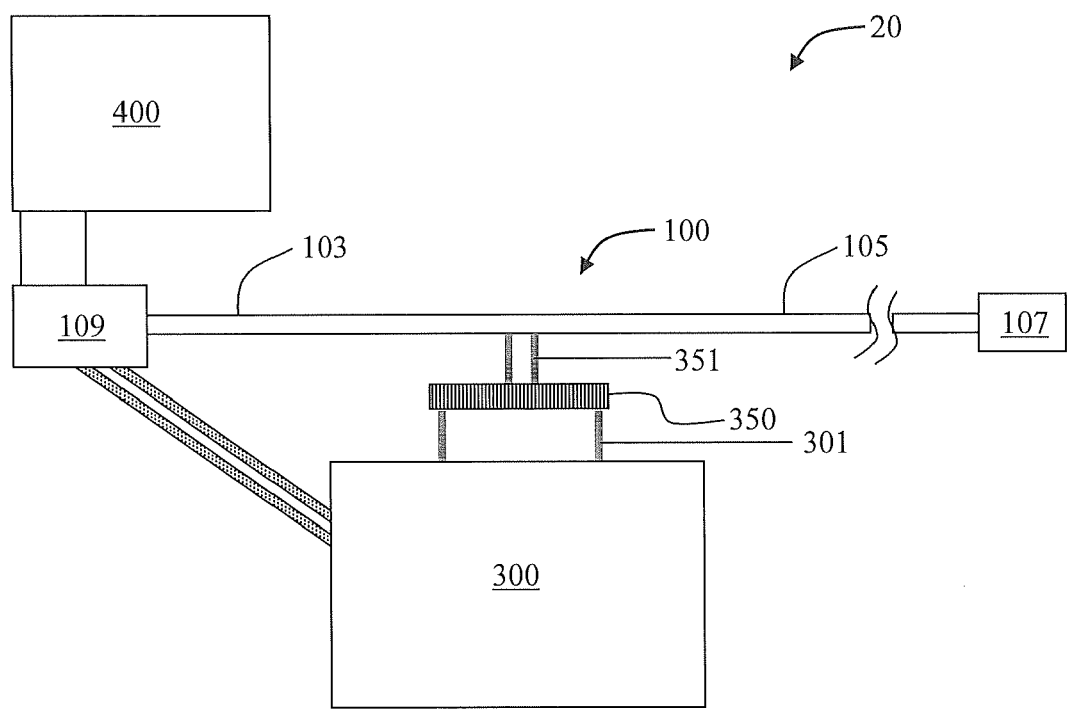
Figure 11:
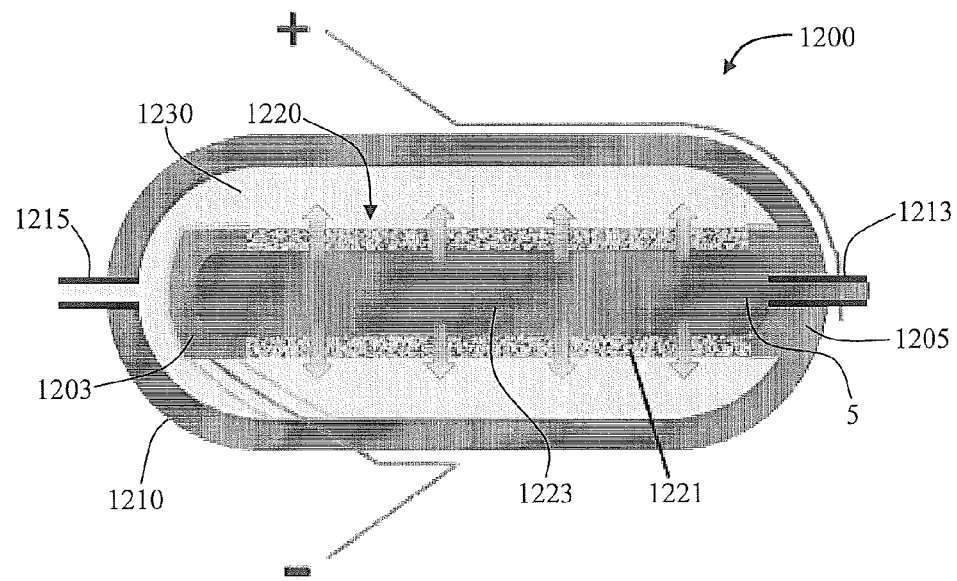
Figure 12:
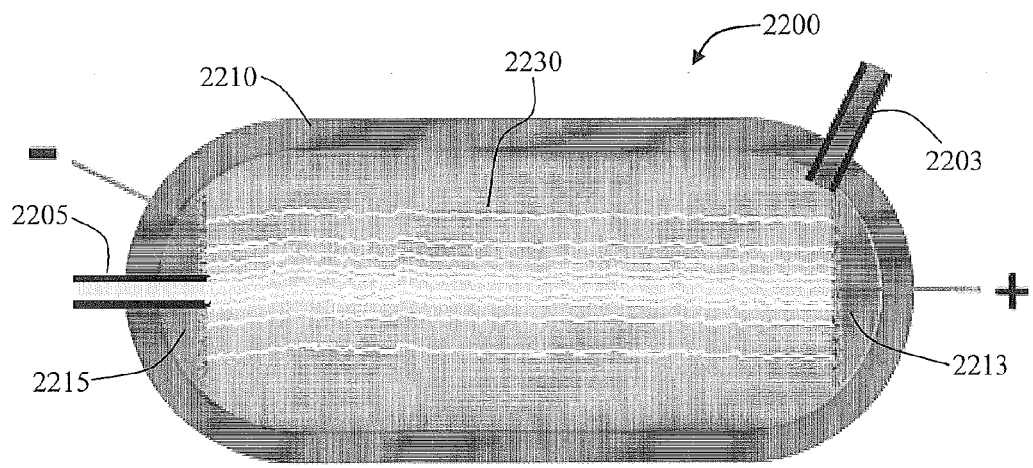
Figure 13:
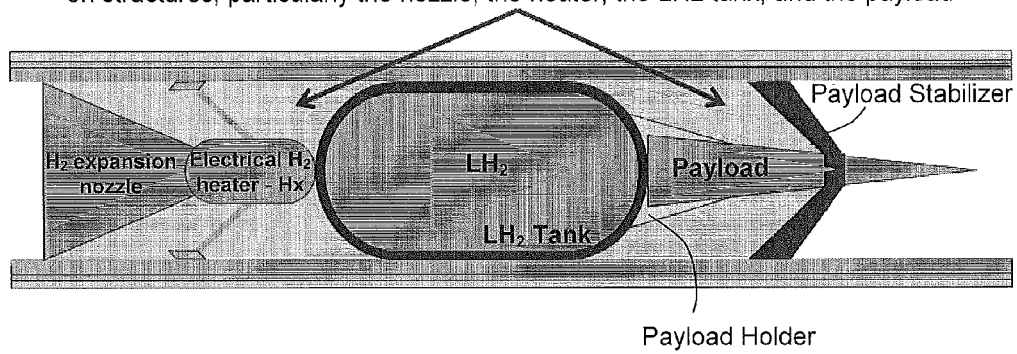
Figure 14:
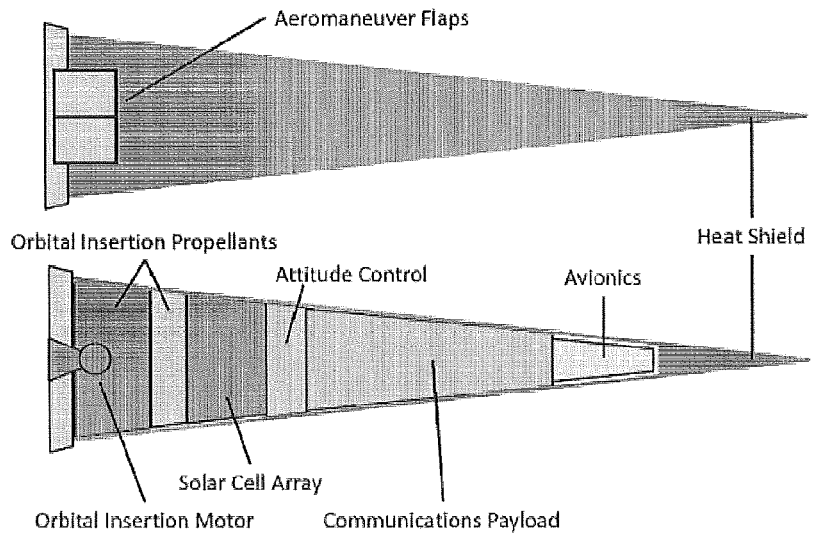
Figure 15:
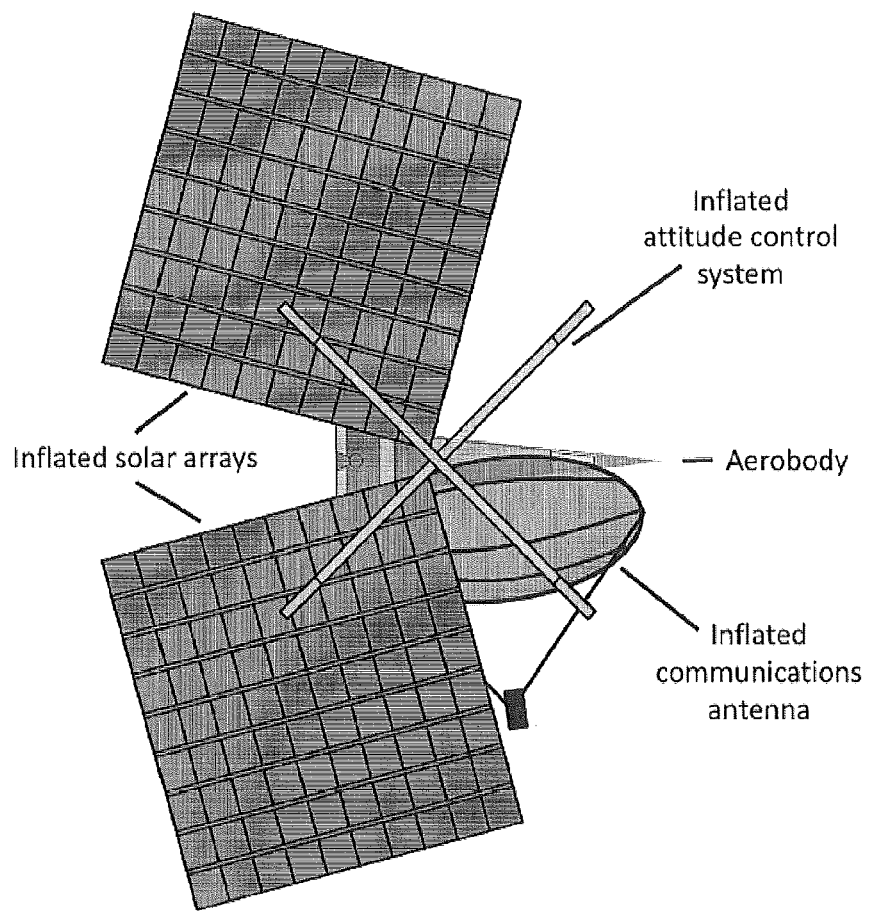

Having thus described the disclosure in the foregoing general terms, reference will now be made to the accompanying drawings, which are not necessarily drawn to scale, and wherein:

FIG. 1 is a side view of a launch system according to an exemplary embodiment of the present disclosure wherein a launch vehicle is positioned within an electrically conductive launch tube;

FIG. 2 is a schematic of a launch tube according to an exemplary embodiment of the present disclosure in comparison with a launch tube from a typical prior art railgun;

FIG. 3 is a graph showing electrical to kinetic energy conversion efficiency as a function of launcher magnetic field intensity for a launcher according to an exemplary embodiment of the present disclosure and a known art electromagnetic launcher;

FIG. 4 is a graph showing electrical to kinetic energy conversion efficiency as a function of launcher magnetic field intensity for a launcher according to an exemplary embodiment of the present disclosure across a preferred range of minimized magnetic field strength;

FIG. 5 is a graph showing efficiency as a function of inductance for a launcher according to an exemplary embodiment of the present disclosure and a known art electromagnetic launcher;

FIG. 6 is a graph showing inductance per unit length versus launcher geometry for a launcher according to an exemplary embodiment of the present disclosure;

FIG. 7 is a graph showing efficiency versus launcher geometry for a launcher according to an exemplary embodiment of the present disclosure;

FIG. 8 illustrates sliding contact according to an exemplary embodiment of the present disclosure;

FIG. 9 is a rear view of a launch system according to an exemplary embodiment of the present disclosure wherein a launch vehicle is positioned within an electrically conductive launch tube;

FIG. 10 is schematic of a launch system according to exemplary embodiment of the present disclosure showing a launch tube in connection with an electrical energy source;

FIG. 11 is a cross-section of an electrical heater according to an exemplary embodiment of the present disclosure comprising elements useful for resistive heating;

FIG. 12 is a cross-section of an electrical heater according to an exemplary embodiment of the present disclosure comprising elements useful for swirl stabilized vortex arc heating;

FIG. 13 is a side view of a launch system according to an exemplary embodiment of the present disclosure wherein a launch vehicle is positioned within an electrically conductive launch tube that includes differential pressurization;

FIG. 14 is an illustration of a payload component of a launch vehicle according to an exemplary embodiment of the present disclosure showing an external view of the payload component and an internal view of the payload component revealing various elements of the exemplified embodiment, the payload component being in an atmospheric transit configuration; and FIG. 15 is the payload component of a launch vehicle according to an exemplary embodiment of the present disclosure shown in FIG. 6, wherein the payload component is in an on-orbit deployed configuration.

DETAILED DESCRIPTION OF THE DISCLOSED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides means for rapid acceleration of a projectile. In a particular embodiment, the projectile can comprise all or part of a space launcher. As such, the disclosure may focus on this embodiment for simplicity in describing the several features of the present subject matter. Nevertheless, the disclosed subject matter is not intended to be limited to space launch or to further specific embodiments discussed herein. Rather, any disclosure in relation to a specific embodiment is intended to be exemplary of the subject matter so as to provide a description sufficient to extend the exemplary discussion to further embodiments.

The present disclosure provides a launch system, one or more apparatuses that can be utilized in the launch system, and one or more methods of launching an object, in particular to a high velocity at rapid acceleration. In certain embodiments, these and further aspects of the disclosure can be achieved though use of an electroantimagnetic ("EAM") launcher that utilizes low atomic weight elements as a propulsion propellant.

Electromagnetic ("EM") launchers have been under active development by the U.S. government and other entities for approximately 30 years. EM launchers (e.g., railguns) rely upon induced magnetic fields created by electrical current flowing down two parallel rails and through a launch apparatus that is accelerated by the electromagnetic effect. Similarly, augmented EM launchers can utilize a driving current that is channeled through additional pairs of parallel conductors that are arranged so as to increase or augment the magnetic field experienced by the launch apparatus. Research to date, however, indicates that EM launchers suffer from severe problems that prevent them from achieving the conditions necessary for space launch. At high velocities, magnetic effects absorb enormous power and energy. This can effectively destroy the ability to achieve stable electrical conduction between a moving launch package and stationary feed conductors. Rather than using electrical energy to create magnetic forces to propel the launch package, the EAM launcher according to the present disclosure can substantially minimize induced magnetic forces and thus likewise minimize the energy drain and distorting effects thereof.

A launch system according to the present disclosure can comprise a number of components that may independently provide useful improvements over known technologies as well as in a number of combinations of the disclosed components. For example, in some embodiments, a launch system according to the present disclosure can comprise a launch tube in electrical connection with an electrical energy source so as to provide electrical energy to a launcher that may comprise one or more of a propellant source, an electrical heater for heating the propellant from the propellant source, sliding contacts in electrical contact with the electrical heater and in electrical contact with the launch tube, an expansion nozzle in fluid communication with the electrical heater and adapted for discharge of one or more heated propellant or a component thereof, and a payload in mechanical connection with one or more of the further components of the launcher.

A side view of components of a launch system 20 according to one embodiment of the present disclosure is shown in FIG. 1. As illustrated therein, a launcher 200 is positioned within a launch tube 100. The launch tube 100 can comprise a plurality of concentric, conductive tubes that can be separated by one or more insulating layers. Alternatively, the launch tube can comprise a single, multi-layer tube comprising a plurality of conductive layers separated by one or more insulating layers. As shown in the embodiment of FIG. 1, the launch tube 100 can comprise an outer conductive tube 110 spaced apart from an inner conductive tube 130 and separated by an insulator 120. The outer conductive tube 110 and the inner conductive tuber 130 can be formed of any suitable, conductive material, such as a metal or metal alloy. In some embodiments, the conductive tube walls can comprise layers of two or more different materials. As exemplary embodiments, one or both of the inner conductive tube and the outer conductive tube can comprise steel, aluminum, or an aluminum alloy. In preferred embodiments, the innermost layer of one or both of the inner conductive tube and the outer conductive tube can comprise a high temperature wear resistant conductive material such as tungsten, rhenium, or hardened copper. As such, one or both of the inner and outer conductive tubes can comprise an outer layer formed of steel or aluminum and an inner layer formed of the high temperature wear resistant conductive material (wherein inner references proximity to the interior of the tube and outer references proximity to the exterior of the tube). In some embodiments, an interlayer material can be formed between the predominant outer layer and the inner layer. For example, an interlayer can comprise copper or molybdenum.

The insulator 120 can comprise any material effective to substantially prevent flow of electrical current between the two conductive tubes. In preferred embodiments, the thickness of the insulator 120 and the total space between the two conductive tubes can be minimized. Such minimization can be useful to minimize the volume of a magnetic field formed by the electric current flow through the conductive tubes. For example, in various embodiments, electric current passes through one of the inner and outer conductive tubes, through an electrical heater, as further discussed below, and back along the other of the inner and outer conductive tubes. The thickness of the insulator and/or the total space between the outer conductive tube and the inner conductive tube can be about 0.5 cm to about 30 cm, about 1 cm to about 20 cm, about 1.5 cm to about 15 cm, or about 2 cm to about 10 cm.

The advantages of the present EAM launcher are evident in comparison to railgun technology. The geometry of the launch tube in particular for the present EAM launcher can significantly reduce or eliminate the adverse effects of large magnetic fields. The key concept driving the known art of EM launchers, such as railguns, has been to maximize the magnetic forces pushing the projectile. In attempts to achieve the greatest launch force, very large magnetic fields are used with EM launchers. This involves a significantly large electrical current requirement and results excessive mechanical pressures from the intense magnetic fields. It also results in very large resistive losses and arc losses. As an example, a typical railgun designed to launch a one ton payload uses 10 million to about 50 million amps of electrical current and magnetic fields of about 10 to about 25 Tesla, with resulting pressures of about 15,000 to about 100,000 PSI. Losses in the system lead to a railgun having roughly 10% efficiency when evaluated at orbital velocities, and this only if one can effectively maintain the structural integrity of the plasma armature. That feat has heretofore never been accomplished, despite government research and development investments on the order of about $1B. The highest recorded, repeatable velocity ever achieved with railgun technology is about 6,000 meters per second, and the highest efficiencies of such high velocity launches was only a few percent.

The EAM launcher according to various embodiments of the present disclosure can require application of an electrical current of about 0.2 to about 2.0 million amps—i.e., a 5 to 200 fold reduction in comparison to typical EM launcher technology. This is particularly relevant since losses and pressures scale as the square of applied electrical current and thus are reduced 25 to 40,000 fold. With that basis, an EAM launcher according to embodiments of the present disclosure can provide dramatic increases in efficiency as compared to EM launcher technology—as much as even a 10,000 fold improvement.

The advantages of the presently disclosed EAM launcher are further evident in the various appended figures. For example, FIG. 2 shows a side-by-side comparison of an exemplary embodiment of a launch tube for an EAM launcher and a launch tube for a typical, known EM railgun. Distinct differences are readily apparent. For example, in the EAM launcher, the conductors can completely encircle the launch tube whereas, in the EM launcher, the conductors form significantly less than 50% of the surface area of the launch tube internal wall. Rather, insulators form the significant majority of the inner launch tube wall surface. The effect of the very large space separating the electrical conductors in the EM launch tube is a large volume, highly intense magnetic field, and this is desired in typical railguns to drive the projectile. On the contrary, in the present EAM launcher, the concentric conductors are separated by only a small distance. As such, the total volume of space between the conductors is minimized and effectively limits that intensity of the induced magnetic field. The significant difference in magnetic field strength is illustrated in FIG. 3.

The electrical to kinetic energy conversion efficiency of a high velocity launcher can be a function of, at least in part, the strength of the magnetic field within the launch tube. Typical, known EM launchers require magnetic fields in the range of 10 Tesla to greater than 20 Tesla. As illustrated in FIG. 3, the electrical to kinetic energy conversion efficiency of the EM launcher increases as the magnetic field strength increases; however, the highest efficiency (at a field strength of about 25 Tesla is only in the range of about 12% (which is an increase from the lowest efficiency of about 1%). The completely opposite effect is seen with the EAM launcher of the present disclosure. Specifically, the efficiency of the EAM launcher drops dramatically as the magnetic force increases. The present EAM launcher, however, surprisingly can achieve an electrical to kinetic energy conversion efficiency of greater than 51% in various embodiments when magnetic field strength is substantially 0 Tesla. Accordingly, in certain embodiments of the present disclosure, the EAM launcher, and particularly the launch tube, can be adapted to transmit necessary ranges of electrical current while generating or inducing a magnetic field at a strength of less than about 1.25 Tesla, less than about 1 Tesla, less than about 0.5 Tesla, less than about 0.25 Tesla, or less than about 0.2 Tesla. In some embodiment, magnetic field can be limited to a strength of about 0.2 Tesla to about 1.2 Tesla. This is graphically illustrated in FIG. 4. In some embodiments, the magnetic field strength can be sufficiently minimized through appropriate minimization of the insulator volume between the concentric conductive tubes. In other embodiments, however, further means for limiting, reducing, or eliminating any magnetic field can be utilized.

Efficiency for an EAM launcher according to the present disclosure can be significantly improved over known art EM launcher technology in relation to further properties. For example, FIG. 5 illustrates the advantages of the presently disclosed EAM launcher over typical, prior art EM launchers in relation to inductance. As seen in FIG. 5, a typical EM launcher seeks to increase inductance per unit length to increase efficiency. On the other hand, efficiency for an EAM launcher according to the present disclosure can be maximized when inductance is minimized.

In order to minimize inductance according to certain embodiments of the present disclosure, it can be desirable to provide the launch tube for the EAM launcher with a desired geometry. As shown in FIG. 6, inductance per unit length can vary based upon the ratio of the outer radius to the inner radius for the launch tube (i.e., the ratio of the radius of the outer tube to the radius of the inner tube). Inductance can decrease as the ratio decreases. Thus, it can be desirable to provide the launch tube with a low ratio—i.e., a minimized total thickness for any space existing between the walls of the conductive launch tube. In certain embodiments, the ratio of outer to inner radius for a launch tube according to the present disclosure can be less than 2, less than about 1.5, less than about 1.25, less than about 1.15 or less than about 1.1. In further embodiments, the ratio of outer to inner radius can be about 1.4 to about 10, about 1.5 to about 7.5, about 1.6 to about 5, about 1.65 to about 4, or about 1.7 to about 2.5.

Launcher geometry also can affect efficiency of an EAM launcher according to the present disclosure. As seen in FIG. 7, the efficiency of an EAM launcher can increase as the ratio of the outer to inner radius for the launch tube decreases. Thus, it further can be desirable to achieve the ratios already noted above. Specifically, it can be desirable to approach a ratio that is as close to 1 as possible (limited only by the necessary thickness of the conductors for carrying current and the thickness of insulators present to prevent high voltage breakdown between the conductive tubes).

The walls of the outer and inner conductive tubes can have one or more slotted tracks of varying geometries that are adapted for receiving one or more sliding contacts. The cross-section of FIG. 1 passes through a slotted track 112 in the inner conductive tube 130 and the insulator 120 (with a portion of the inner tube and insulator cut away to reveal the sliding contact in the slotted track). The slotted track 112 provides for an electrical connection of the outer conductive tube 110 and an outer sliding contact 115. An inner sliding contact 135 is also illustrated in electrical connection with the inner conductive tube 130. The slotted tracks can be effective to facilitate proper contact between the tubes and the sliding contacts, to prevent or substantially reduce arcing between the tube conductors, and also serve to align the launcher 200 and substantially prevent rotating thereof within the launch tube 100. Aligning arms 113 and 133 can be in physical contact with the sliding contacts 115 and 135, respectively, and also be in physical contact with the electrical heater. The aligning arms preferably comprise a high strength, rigid material, such as steel or a further metal alloy that can include an insulative layer, if desired.

The sliding contacts can be formed of a suitable conductive material and can take on particular structures, as further discussed below. Preferably, the conductive sliding contacts are positioned so as to define a mechanical sliding contact with the tube walls while exhibiting only a low voltage drop. In some embodiments, the conductive sliding contacts can define an arcing sliding contact with the conductive tube walls with only a minimal voltage drop. The arc may be contained via mechanical containment, such as using a sliding insulating perimeter. In other embodiments, the arc may be contained via magnetic forces, which can be generated by the current transferring from the contact. In particular, the contacts may define a current loop adapted to generate the magnetic forces. In some embodiments, the magnetic forces can be generated by a self contained power source that may be present on the launcher. As an example, the magnetic forces can be generated by a magnet, which may be a superconducting magnet.

In some embodiments, the sliding contacts and/or the slotted track insulators can be cooled. Such cooling can be via conductive and/or convective means. For example, the contacts may be cooled by a material component of the sliding contact that melts and/or vaporizes during use. In alternate embodiments, the sliding contact can be cooled by a transpiring fluid. The transpiring fluid can be conductive. Further, the fluid can be a low melting metal having a low ionization potential. As non-limiting examples, the metal can be cesium, aluminum, lithium, or an analogous low melting soft metal with low ionization potential. Similarly, an insulating perimeter of the contacts and/or the alignment arms can be transpiration cooled. For example, the transpiration fluid can be an insulating material such as hydrogen, sulfur hexafluoride, or a like liquid or gas.

In certain embodiments, sliding contacts according to the present disclosure can be adapted to exhibit one or more state transitions. For example, the sliding contacts initially can define a sliding solid-solid interaction with a solid tube wall. This solid-solid interaction can transition to a liquid-solid interaction when at least a portion of the sliding contact that interacts with the tube wall is adapted to transition to a liquid metal melt. This can occur, for example, when the launch vehicle reaches a velocity of about 1000 to about 2000 m/sec. This can transition further, such as to an arcing contact. Such transition can occur, in certain embodiments, at a velocity of about 1500 to about 3000 msec. A majority of electrical current transfer to the sliding contact may occur during the arcing phase. The sliding contacts can include mechanical, fluid dynamic, arc seeding, and electromagnetic features to minimize the arc voltage and thus the energy loss at the contact. In some embodiments, arc voltage can be about 50 to about 500 V. The arc preferably is stably positioned at the contact and does not substantially move outside of the desired contact region.

An exemplary sliding contact pad is shown in FIG. 8. The sliding contact 500 includes an outer cooled rim 503 (e.g., transpiration cooled, such as with hydrogen or with sulfur hexafluoride frozen into the pores). In one embodiment, porous material with liquid $SF_6$ can be cooled with liquid hydrogen to freeze the SF6 in the pores. Alternatively, the liquid $SF_6$ can be sealed under pressure and released as the surface melts. Moving inward in FIG. 8, the sliding contact 500 further includes a magnetic rim 505, an ablative shield 507, an inner cooled rim 509, an ablative rim 511, and the conductor 513.

The outer conductive tube and the inner conductive tube can define one current outbound path in series with one return current path. In some embodiments, there can be multiple current outbound paths in parallel. If desired, all outbound paths can be in series with multiple return current paths. The launcher inductance can be lowered proportionately to the number of parallel current paths. Beneficially, the lower inductance can lower the magnetic field energy and thus any undesired effects of the magnetic field.

The arrangement of the launch vehicle 200 and the launch tube 100 is further illustrated in FIG. 9, which shows an end view thereof. Again, the launch tube 100 includes an outer conductive tube 110 and in inner conductive tube 130 separated by an insulator 120. Sliding contacts (115, 135) are in electrical connection with the walls of the respective conductive tubes (110, 130). More particularly, outer sliding contact 115 is in electrical connection with outer conductive strip 117, and inner sliding contact 135 is in electrical connection with inner conductive strip 137. The sliding contacts (115, 135) interconnect with the electrical heater 220 via aligning arms (113, 133). The exhaust nozzle 210 is shown partially transparent to reveal some of the forward components of the launch vehicle 200.

In some embodiments, the launch tube can be aligned by active alignment devices. Further, the tube can be defined as being substantially horizontal with the exception of a section defining and tube exit, where the tube may curve upward. The tube also can be characterized as substantially following the curvature of the Earth. The tube can be at a constant slope angle, and tube bed can be graded to the tube constant slope angle. Further, the launch tube can be installed on naturally sloping ground. Alternatively, the launch tube can be installed in a slanted tunnel underground. In certain embodiments, the launch tube can be moveable. For example, the launch tube can be moveable in one dimension to change launch elevation or launch azimuth. Preferably, the launch tube can be moveable in two dimensions, as this can be beneficial to enable change in both elevation and azimuth. If desired, the launch tube can be mounted on a moveable vehicle such as a ship or a submarine. In certain embodiments, the launch tube can be defined by an initial launch section and a main launch section. The initial launch section can be, for example, up to approximately 200 meters in length, and the main launch section can be, for example, approximately 1,000 meters or greater in length.

The launch tube specifically may be evacuated. Further, the launch tube may be backfilled with a light gas, preferably at low pressure. This can be beneficial to minimize aerodynamic drag during acceleration while providing increased resistance to arc breakdown ahead of the launch package. In particular embodiments, the launch tube can be evacuated, and a high speed pulse of gas can be introduced time sequentially along the tube so as to coat the tube walls with a layer of gas. This can function to insulate the tube walls but is present for a time sufficient to expand into the majority of the tube diameter and thus increase aerodynamic drag. Such introduction of gas can be via transpiration through the tube walls.

The launch tube exit can be sealed with a device to substantially or completely prevent air ingress until the launch package arrives. In various embodiments, the exit seal can be, for example, a high speed mechanical shutter, one or a series of aerodynamic curtains, or relatively a thin membrane or combination of multiple membranes through which the launch package can safely fly. When the exit device is a thin membrane or membranes, one or several small explosive charges may be provided to destroy the membrane prior to arrival of the launch vehicle at the exit. Such charges can particularly function as a fail safe mechanism. For example, the explosive charges may be used to intentionally damage a projectile prior to letting it leave the launch tube such that the projectile disintegrates almost immediately upon exiting the launch tube so as to abort a launch which does not meet specified requirements.

Referring to FIG. 10, an electrical energy source 300 can be provided to supply electrical energy to the launch tube 100, which comprises an initial launch tube section 103, a main launch tube section 105, and a launch tube exit 107. In certain embodiments, the electrical energy source 300 can comprise a battery bank. For example, a series of lead acid batteries (e.g., automotive batteries) may be used. Any further battery or suite of batteries suitable for providing electrical energy on demand likewise may be used. In particular embodiments, an inductor 350 can be interposed between the battery bank and the launch tube such that the battery bank charges the inductor while the inductor is in a charge state. Thereafter, the inductor 350 can be switched to a discharge state wherein the inductor discharges into the launch tube. The discharge into the launch tube may be initiated by explosively actuated switches. Alternatively, the discharge switching may comprise the use of conventional switches with capacitor mediated arcing control. Preferably, the inductor can have a core comprising a high permeability material. In particular, the core can be adapted for high discharge rates and low eddy current losses. Moreover, the inductor can be actively cooled, the core can be actively cooled, and/or the conductors can be actively cooled.

Any power source adapted to provide about 200 to about 2000 kiloamps at about 500 to about 5000 volts can be used as the electrical energy source according to the present disclosure. Non-limiting examples of electrical energy sources that may be used include capacitors, standard power plant generators, rocket turbine driven turbogenerators, and the like. In relation to cost and reliability, batteries (e.g., lead acid batteries) driving an inductor as described above can be preferred.

The launch vehicle 200 is initially positioned inside the launch tube 100 near the staging station 109 in the initial launch tube section 103. The launch system 20 can comprise additional elements as illustrated in FIG. 10, such as the payload preparation and launch operations building 400. Briefly, in use, electrical energy is transferred from the electrical energy source 300 via conduit 301 to the inductor 350 and then through conduit 351 to the launch tube 100. The electrical energy passes through the conductive launch tube to the electrical heater 220 via the sliding contacts (115, 135). The electrical energy specifically between the electrical heater 220 and the sliding contacts (115, 135) through the aligning arms (113, 133). Propellant from the propellant tank 230 is heated in the electrical heater 220 and exits the expansion nozzle 210 at a velocity in the range of about 7 to about 16 km/s to propel the launch vehicle 200 down the launch tube 100.

The propellant that is heated in the electrical heater 220 can comprise a light gas, and preferably is a gas that is ionizable at high temperatures. In a preferred embodiment, the light gas used as the propellant can be hydrogen. The electrical heater 220 preferably is adapted to heat the hydrogen or other propellant to a high temperature, such as in the range of about 1,000 K to about 100,000 K, about 2,000 K to about 50,000 K, about 2,500 K to about 20,000 K, about 3,000 K to about 15,000 K, about 3,500 K to about 10,000 K, or about 3,500 K to about 5,000 K. In some embodiments, the exhausted gas exiting the expansion nozzle 210 can be molecular hydrogen (i.e., with a molecular weight of 0.002 kg/mole). In further embodiments, the exhausted gas exiting the expansion nozzle 210 can be atomic hydrogen (i.e., with a molecular weight of 0.001 kg/mole). In still further embodiments, the exhausted gas exiting the expansion nozzle 210 can be hydrogen plasma (e.g., with a molecular weight of 0.0005 kg/mole).

In one exemplary embodiment, the electrical heater 220 can comprise a resistive heater such as illustrated in FIG. 11. The resistive heater 1200 can comprise a resistive heater shell 1210 encasing an electrically heated, heat cylinder 1220. The resistive heater shell may define a containment vessel. The heat cylinder can be formed of a variety of materials and composite structures. For example, a low density, high melting point material such as carbon may be used. In some embodiments the cylinder may comprise carbon coated with a further material, such as diamond, tungsten, hafnium carbide, or multiple layers of one or more different materials. Such can be beneficial to improve heat transfer performance, strength, and reliability. The heat cylinder can be a transpiration tube element. For example, a porous tungsten heat cylinder can be used. The resistive heater shell 1210 can comprise any material suitable to contain the hot, expanding gas exiting the porous heat cylinder 1220 for controlled discharge through a gas discharge port 1215. The propellant gas 5 enters the resistive heater 1200 through gas entry port 1213 through which it passes into the open core 1223. Inside the porous heat cylinder 1220, the propellant gas 5 is heated to a temperature as described herein via electrical resistance heating from the electrical current passing through the electrical terminals (1203, 1205). The heated gas expands (or transpires) outward through the pores in the porous heat cylinder walls 1221 and fills the expansion chamber 1230 of the resistive heater 1200 prior to exiting the resistive heater 1200 through the discharge port 1215.

In another exemplary embodiment, the electrical heater 220 can comprise an arc heater such as illustrated in FIG. 12. The arc heater 2200 can comprise an arc heater shell 2210 encasing a swirl chamber 2230. The arc heater shell may define a containment vessel and may comprise transpiration cooled walls. The propellant gas 5 enters the arc heater 2200 through gas entry port 2213 through which it passes into the swirl chamber 2230 wherein the propellant gas is heated to a temperature as described herein via electrical arc passing between the electrical terminals (2203, 2205). As illustrated, the electrical terminals (2203, 2205) of the arc heater 2200 can be coaxial and spaced apart by the swirl chamber 2230. In some embodiments, the electrical terminals can be transpiration cooled. The arc vortex within the swirl chamber 2230 can be vortex stabilized. In particular, the propellant gas 5 is injected tangentially into the swirl chamber via gas entry port 2213 rather than coaxially with the gas discharge port 2215. This can form a helical vortex as the fluid is heated by the arc discharge before being expanded through the gas discharge port 2215. Arc stability, heat transfer, and reliability may be improved by swirl stabilization, as well as transpiration, seeding, and like means.

Although hydrogen gas is a preferred propellant, other propellants may be used, and various materials may be combined. For example, the propellant gas may be seeded with an ionizable element and/or a further reactive element and/or an inert element. Non-limiting examples include cesium, rubidium, potassium, sodium, lithium, lithium hydride, argon, oxygen, and helium. The presence of such additional elements can be useful to promote arc stability, conductivity, and ionization. In some embodiments, the seeded elements may be present as only a small fraction of the total mass of propellant, such as less than about 5%, less than about 4%, less than about 3%, less than about 2%, or less than about 1% by mass.

The expansion nozzle can take on any form suitable for expansion of the hot gas exiting the electrical heater so as to accelerate the launch vehicle in the manner described herein. In some embodiments, the exhaust nozzle can comprise a porous nozzle throat. Preferentially, the pores can be filled with a material that absorbs heat, such as by one or more of melting, vaporization, and disassociation. In certain embodiments, the heat absorbing material can comprise solid hydrogen, solid lithium, or water ice. In further embodiments, the exhaust nozzle can include a nozzle throat that is transpiration cooled, such as with a light gas, including hydrogen gas.

The propellant tank 230 utilized with the launch vehicle 200 may be reusable. Preferably, the propellant tank is sized to include a sufficient volume of propellant (e.g., high pressure gas; liquid, semi-solid slush hydrogen, lithium hydride, water, or other materials that yield low molecular weight gases and high exhaust velocities upon being heated to high temperatures) to achieve exit of Earth's atmosphere or to substantially exit Earth's gravitational pull. In some embodiments, the propellant tank can be substantially cylindrical in shape. In some embodiments, the propellant tank can be formed of carbon composite materials. The propellant tank particularly can be adapted to support the mechanical load of payload positioned in front of the tank, minus the pressurization between the tank and the payload, as further discussed below.

The propellant tank can be sized to have an outer diameter that is substantially identical to the inner diameter of the launch tube. In some embodiments, the propellant tank is in physical contact with the inner wall of the launch tube over a portion of the outer surface of the tank. In specific embodiments, the propellant tank may include sliding contact strips on at least a portion of the outer surface. As such, the majority the tank structure is positioned slightly away from the tube inner surface. The sliding contact strips can be adapted to vaporize as the velocity of the launch vehicle increases and provide a low drag gas bearing to minimize frictional drag. The strips can be designed to produce a vapor that is insulating so that it inhibits rather than promotes any arcing. For example, the sliding contact strips may comprise pores filled with liquid sulfur hexafluoride.

The location of a launch system according to the present disclosure can vary. In some embodiments, the launch system can be located on the Earth. In other embodiments, the launch system can be at a non-terrestrial location, including in free space or on another celestial body.

During launch of the launch vehicle, the exit velocity can be in the range of about 2,000 to about 50,000 msec, about 4,000 to about 30,000 msec, about 6,000 to about 15,000 msec, or about 8,000 to about 12,000 msec. In some embodiments, the launch vehicle initially can be accelerated to a velocity of about 100 to about 5,000 msec using an alternate power means. For example, the initial launch velocity can be achieved using a single stage light gas gun. In such embodiments, the light gas (e.g., hydrogen) can be preheated, particularly electrically preheated, and more particularly preheated using electrical heating that is derived from the same energy supply as the launch vehicle. In alternate embodiments, the initial velocity achieved by such means can be about 500 to about 3,000 msec or about 1500 to about 2500 msec.

As discussed above in relation to the propellant tank, the launch vehicle can be stabilized in one or more manners during passage though the launch tube. One exemplary method is the use of the sliding contact strips on the propellant tank. In other embodiments, the launching method can be particularly important. For example, in certain embodiments, electrical heating is not utilized during the initial launch stage. As seen in FIG. 10, the launch tube 100 can comprise an initial launch tube section 103. In this section, the launch vehicle can be accelerated via a hot expanding gas (e.g., hydrogen). The utilization of a light gas gun model at the initial launch stage can be useful to accelerate the launch vehicle to as high a velocity as possible before electrically power thrust is initiated. This can conserve propellant from the launch vehicle propellant tank and also conserve electrical energy. This also can ensure that the sliding electrical contacts are already moving at a high velocity before they begin conducting current. This can be particularly relevant when the sliding contacts are adapted for state transitions. The initial launch tube section (i.e., the first stage launcher) typically is not powered and is electrically isolated from the second stage launch tube. This can be beneficial to avoid low velocity conduction where overheating may occur arising from excessive contact duration of the sliding contacts at any given point on the conductive launch tube wall.

In some embodiments, the launch vehicle can be further stabilized within the launch tube via differential pressurization. As illustrated in FIG. 13, shaded areas around the launch vehicle positioned within the launch tube can be differentially pressurized to minimize acceleration induced mechanical stress on structures, particularly the nozzle, the heater, the propellant tank, and the payload.

Electrical heating of a low molecular weight gas, such as hydrogen, can provide a uniquely high speed rocket exhaust as noted above that has heretofore been unattainable with known chemical rocket technology. This in turn can lead to designs that can achieve, in exemplary embodiments, 15% to 45% payload fractions to orbit. Accordingly, rather than requiring the use of a rocket having a mass on the order of 50 to 500 tons, the launch systems of the present disclosure can launch packages in a cost effective manner, the packages being orders of magnitude smaller than rocket-based systems (e.g., 0.05 to 1 ton or 0.2 to 2 tons).

The launch vehicle is accelerated inside an evacuated tube rather than in free flight. The launch vehicle preferably can be disallowed from exiting the launch tube unless the system confirms safe launch conditions exist. After exiting the launch tube, the launch vehicle can maneuver through the atmosphere to orbit or to a specific destination (e.g., an extraorbital site in relation to space flight or a defined terrestrial location in relation to intra-atmospheric launches).

Returning to FIG. 1, the launch vehicle 200 also can comprise a payload 240. The payload 240 can be removably connected to the propellant tank 230. As illustrated, a payload connection element 250 provides the connection, and any suitable means for removably connecting the payload 240 to a further component of the launch vehicle 200 can be used. The launch system 20 further can include a payload stabilizer 260, which can comprise one or more arms or like element that is positioned between the payload 240 and the inner tube wall 130 (preferably near the forward tip of the payload) and stabilizes the payload against radial movement while passing through the tube 100. The payload stabilizer 260 preferably disengages from the payload at or near the exit 107 of the launch tube 100.

The payload can be a container housing various types of cargo, including, but not limited to, human passengers, consumable resources, communication equipment, power components, arms, ordinances, raw materials, and the like. The nature of the cargo can, in some embodiments, define certain parameters of the launch system. For example, the dimensions of the launch tube and acceleration of the launch vehicle can be different for human passengers or cargo subject to adverse effects of experiencing excessive G forces. In some embodiments, the length of the launch tube 100 in meters as shown in FIG. 10 (particularly the main launch tube section 105) can increase as the cube root of the launched mass in kilograms. In some embodiments, a launch tube has a length of up to about 500 to about 1000 miles in length. Further, launch conditions for humans, etc. can be limited such as to about 2 G's to no more than 60 G's acceleration. In certain embodiments, the length of the launch tube 100 in meters can be equal to the square of the launch velocity divided by twice the average acceleration of the launch.

Further considerations in relation to the launch package are described below. In some embodiments, the launch package can have inertial sensors and actuators that actively maintain its alignment and orientation while being accelerated in the launch tube. In some embodiments, the launch package can be monitored during the launch acceleration interval for integrity and nominal performance. Preferably, emergency procedures can be implemented based on monitoring results to optimize the launch and to protect the launch tube. Further, the launch can be aborted by destroying the launch package immediately or shortly after its exit from the launch tube. In some embodiments, the launch package can be separated from the remaining components of the launch vehicle during or immediately after launch. These separate components can be defined as a flyout payload portion and a discarded or recycle portion. Separation of components can be significantly rapid and can utilize, for example, a gas bag discharge or explosive bolt disconnects. The separation can be aided by the aerodynamic forces after exit. In particular embodiments, the flyout payload can have a heat shield with a transpiration cooled nosetip to maintain the nosetip integrity, shape, sharpness, low drag, and low pressure moment during exit from the atmosphere. In some embodiments, the flyout payload can have a small positive stability, neutral stability, or a negative aerodynamic stability based on its center of pressure location relative to its center of mass location. In some embodiments, the flyout payload can maneuver at high lateral acceleration levels to optimize flight path through the atmosphere and change launch azimuth. In some embodiments, the flyout payload can have a high lift to drag ratio. In some embodiments, the payload can have a lifting body design. In some embodiments, the flyout payload can have aerodynamic control surfaces with very high speed response and low drag. In particular, the surfaces can be base split flaps or the surfaces can be actuated with piezoelectric actuators.

In some embodiments, the flyout payload can be an orbital satellite. For example, the satellite can be a communications satellite, a sensor satellite, resupply vehicle, or a weapon. In some embodiments, the flyout payload can be a suborbital payload. For example, the payload can be a commercial package to be delivered rapidly to long distances, the payload can be a sensor payload, the payload can be a UAV or other unmanned vehicle, or the payload can be a weapon. In such embodiments, the payload may contain subparts that can be dispersed before impact, the payload can remain intact until impact, or multiple payloads can impact at or near the same location for deep penetration. In some embodiments, the satellite can contain an inflatable solar array for power. In some embodiments, the satellite can contain an inflatable magnet array to effect attitude control in orbit. In some embodiments, the satellite can contain an inflatable antenna array to effect communications in orbit. In some embodiments, satellite contains inflatable structures to effect missions in orbit. In particular, the inflatable structures can harden to rigidity after deployment.

In some embodiments, the design lifetime of the satellite can be less than about 10 years, less than about 5 years, less than about 2 years, or less than about 1 year. In some embodiments, the satellite orbital altitude can be such that the orbital lifetime due to aerodynamic drag can be less than about 5 years, less than about 2 years, less than about 1 year, less than about 6 months, less than about 3 months, or less than about 1 month. In some embodiments, the satellite can achieve longer orbital lifetime through magnetic thrust against the Earth's magnetic field using an inflatable magnetic array, through pressure induced by sunlight and solar wind on an inflatable solar sail, or through magnetohydrodynamic (MHD) propulsion against ionized upper atmosphere molecules.

The launch system of the present disclosure can provide certain advantages over known space launch systems. In some embodiments, payload cost can be reduced through using commercial grade parts with high initial failure rates and then iterating quickly through launch, fail, and redesign cycles to achieve higher and higher reliability quickly over time. Further, the launcher and up to thousands of payloads can be designed simultaneously for a single purpose, if desired. In some embodiments, the payloads can be all communication satellites. In some embodiments, the satellites can be radiofrequency communication satellites. In some embodiments, the satellites can be optical communications satellites. In some embodiments, the payloads can be reflective relays for millimeter waves or optical beams. In some embodiments, the payloads can be nuclear waste containers. In some embodiments, the flyout payload can have a heat shield with a porous nosetip filled with a material that absorbs heat by melting and/or vaporization and/or disassociation to maintain the nosetip integrity, shape, sharpness, low drag, and low pressure moment during exit from the atmosphere. In particular, the material can be solid hydrogen or lithium or ice.

One embodiment of a payload for a launch vehicle according to the present disclosure is provided in FIG. 14 (in an atmospheric transit configuration) and FIG. 15 (in an on-orbit deployed configuration). The embodiment illustrates an example integrating launch capabilities, satellite structure, and communications services. Specifically, FIG. 14, shows an external view of the exemplary launch vehicle payload component as well as a cut-away view revealing an exemplary compartmentalization of the multiple elements of the payload component. In the external view, the payload component has a conical shape to provide favorable aerodynamics, but other shapes are also encompassed. The payload component specifically is shown with aeromaneuver flaps and a nose cone heat shield. In the internal view, the payload component houses (from base to tip) an orbital insertion motor, orbital insertion propellants, a solar cell array, attitude control, a communications payload, and avionics. The illustration of FIG. 15 shows the remaining aerobody of the payload component in connection with its inflated solar arrays, inflated attitude control system and inflated communications antenna. Further examples of a payload carrying a variety of useful elements for orbital delivery are provided in U.S. Pat. No. 6,921,051, the disclosure of which is incorporated herein by reference in its entirety.

In further embodiments, the present disclosure can provide methods for launching a payload. For example, in certain embodiments, the present disclosure can provide an electroantimagnetic launch method for accelerating a launch vehicle. The method can comprise electrically heating a propellant to form an expanding gas that accelerates the launch vehicle through a launch tube to a velocity of at least about 5,000 with an acceleration force of about 2 to about 2,000 G's while limiting a magnetic field within the tube to no more than about 2 Tesla." The launch method can be defined by a variety of combinations of the further elements of the EAM launch system as otherwise described herein.

EXAMPLE

Mathematical modeling of launch systems was carried out to exemplify the advantages of the presently disclosed EAM launcher, particularly in relation to typical, prior art EM launchers.

$$F=MA=0.5 \times L' \times I^2$$

F=Force in Newtons
M=Mass in kg
A=acceleration in meters per second squared
L'=the increase in inductance per meter of travel in the launch tube in microhenries per meter
I=current in amps
Modeling of a Typical Known Art Railgun (for a 1 Ton Payload)
L'=5 E−7 H/m
I=20E6 A
F=0.5×5E−7×(20E6)$^2$=0.5×5E−7×400E12=1E8 N
A=F/M=1E5 m/sec$^2$=10,000 G's
Typical efficiency demonstrated at 6000 m/sec is about 0.1% to 1%
Typical efficiency demonstrated at 3000 m/sec is about 10-15%
Modeling of a Typical Known Art Coilgun (for a 1 Ton Payload)
L'=500 E−7 H/m
I=2E6 A
F=0.5×500E−7×(2E6)$^2$=0.5×500E−7×4E12=1E8 N
A=F/M=1E5 m/sec$^2$=10,000 G's
Highest velocity ever achieved by a coilgun was about 1000 m/sec
Key problem is that the drive voltages required are:

$$\text{Drive voltage}=V=L' \times I \times \text{Velocity}=500E-7 \times 2E6 \times 8000=400,000 \text{ volts}.$$

It is believed that it has no previous work has heretofore achieves voltages over about 50,000 volts in a coil launcher, and this has limited the velocities that can be attained. Moreover, capacitors are the only known power source to drive a coilgun. When considering an efficiency of 20%, one ton at 8800 m/sec requires 194 Gigajoules of capacitors. As capacitor power supplies presently cost roughly $1/Joule, this model would require $194B for the power supply alone. EAM Launcher According to the Present Invention (for a 1 Ton Payload)
L'=0.2 E−7 H/m
I=0.5 E6 A Magnetic force $F=0.5\times 0.2E-7\times(0.5E6)^2=0.5\times 0.5E-7\times 0.25E12=6.25E3$ N
$A=F/M=6.25$ m/sec$^2$=0.6 G's (so the magnetic "push" is 0.6 G's, versus the "gas nozzle push" of around 500 G's).

As seen above, the present EAM launcher can lower required electrical current by 40 fold versus the railgun and 4 fold versus the coilgun, thus reducing the resistive and arcing and magnetic energy storage losses by 1600 times and 16 times respectively. The low launcher current makes it compatible with low cost power supplies.

The rocket propulsion effect has been demonstrated to achieve velocities over 20,000 msec in space. The presently disclosed EAM launcher is particularly advantageous in light of the combination of an electrically powered rocket in a conductive tube designed to maximize propulsion force per unit current while eliminating magnetic fields and forces to the maximum extent possible. This lowers losses due to resistive heating losses, arc losses, and stored magnetic energy losses.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An electroantimagnetic launch method for accelerating a launch vehicle to a high velocity, the method comprising electrically heating a propellant to form an expanding gas that accelerates the launch vehicle through a launch tube to a velocity of at least about 5,000 msec with an acceleration force of about 2 to about 2,000 G's while limiting a magnetic field within the tube to no more than about 2 Tesla.

2. The electroantimagnetic launch method according to claim 1, wherein the launch vehicle comprises:
   a payload container;
   a propellant tank containing the propellant;
   an electrical heater separate from and in fluid connection with the propellant tank, the electrical heater being configured to receive the propellant from the propellant tank and being adapted for electrical heating of the propellant to form an exiting exhaust; and
   one or more electrical contacts adapted for directing flow of electrical current through the electrical heater.

3. The electroantimagnetic launch method according to claim 2, wherein the launch vehicle further comprises an expansion nozzle in fluid communication with the exiting exhaust from the electrical heater.

4. The electroantimagnetic launch method according to claim 2, wherein the electrical heater is a resistive heater.

5. The electroantimagnetic launch method according to claim 4, wherein the resistive heater comprises an electrically heated porous cylinder inside a containment vessel.

6. The electroantimagnetic launch method according to claim 5, wherein the electrically heated porous cylinder comprises tungsten walls.

7. The electroantimagnetic launch method according to claim 2, wherein the electrical heater is an arc heater.

8. The electroantimagnetic launch method according to claim 7, wherein the arc is a swirl stabilized vortex arc.

9. The electroantimagnetic launch method according to claim 8, wherein the arc heater comprises a swirl chamber inside a containment vessel.

10. The electroantimagnetic launch method according to claim 9, wherein the arc heater comprises coaxial electrical terminals spaced apart by the swirl chamber.

11. The electroantimagnetic launch method according to claim 2, wherein the electrical contacts comprise sliding electrical contacts.

* * * * *

UNITED STATES PATENT AND TRADEMARK OFFICE
CERTIFICATE OF CORRECTION

PATENT NO. : 9,862,506 B2
APPLICATION NO. : 15/251408
DATED : January 9, 2018
INVENTOR(S) : Miles R. Palmer It is certified that error appears in the above-identified patent and that said Letters Patent is hereby corrected as shown below:

On the Title Page

Item (56), in Column 2, under "Other Publications", Line 2, delete "Atmosperic" and insert -- Atmospheric --.

Item (74), in Column 2, under "Attorney, Agent, or Firm", Line 2, delete "(US)LLP" and insert -- (US) LLP --.

On the page 2, item (56), in Column 2, under "Other Publications", Line 6, delete "Temerature" and insert -- Temperature --.

On the page 2, item (56), in Column 2, under "Other Publications", Line 7, delete "Superonductivity," and insert -- Superconductivity, --.

On the page 2, item (56), in Column 2, under "Other Publications", Line 7, delete "Wolrld" and insert -- World --.

On the page 2, item (56), in Column 2, under "Other Publications", Line 46, delete "Hunsville," and insert -- Huntsville, --.

On the page 2, item (56), in Column 2, under "Other Publications", Line 47, delete "arc.aaa.org," and insert -- arc.aiaa.org, --.

In the Drawings

On sheet 4 of 12, in FIG. 5, Line 2 (X-axis), delete "(µH/meter" and insert -- (µH/meter) --.

In the Specification

In Column 1, Line 50, delete "Aeronautic" and insert -- Aeronautics --.

Signed and Sealed this
Fourth Day of June, 2024

Katherine Kelly Vidal
*Director of the United States Patent and Trademark Office*

CERTIFICATE OF CORRECTION (continued)
U.S. Pat. No. 9,862,506 B2

In Column 3, Line 50, delete "msec." and insert -- m/sec. --.

In Column 3, Line 53, delete "msec" and insert -- m/sec --.

In Column 3, Line 55, delete "msec." and insert -- m/sec. --.

In Column 3, Line 56, delete "msec." and insert -- m/sec. --.

In Column 4, Line 41, delete "msec" and insert -- m/sec --.

In Column 4, Line 44, delete "msec" and insert -- m/sec --.

In Column 4, Line 47, delete "msec," and insert -- m/sec, --.

In Column 4, Line 53, delete "msec." and insert -- m/sec. --.

In Column 5, Line 27, delete "msec." and insert -- m/sec. --.

In Column 5, Line 29, delete "msec." and insert -- m/sec. --.

In Column 5, Line 30, delete "abut" and insert -- about --.

In Column 10, Line 37, delete "though" and insert -- through --.

In Column 14, Line 51, delete "msec." and insert -- m/sec. --.

In Column 18, Line 57, delete "msec," and insert -- m/sec, --.

In Column 18, Line 58, delete "msec," and insert -- m/sec, --.

In Column 18, Line 59, delete "msec," and insert -- m/sec, --.

In Column 18, Line 59, delete "msec." and insert -- m/sec. --.

In Column 18, Line 61, delete "msec" and insert -- m/sec --.

In Column 19, Line 2, delete "msec" and insert -- m/sec --.

In Column 19, Line 3, delete "msec." and insert -- m/sec. --.

In Column 19, Line 6, delete "though" and insert -- through --.

In Column 22, Line 16, delete "Tesla."" and insert -- Tesla. --.

In Column 23, Line 12, delete "msec" and insert -- m/sec --.

CERTIFICATE OF CORRECTION (continued)
U.S. Pat. No. 9,862,506 B2

In the Claims

In Column 23, Line 36, in Claim 1, delete "msec" and insert -- m/sec --.

In Column 24, Line 1, in Claim 2, after "according" insert -- to --.